| (12) | United States Patent | (10) Patent No.: US 12,548,106 B2 |
|---|---|---|
| | Kan et al. | (45) Date of Patent: Feb. 10, 2026 |

(54) VIDEO WATERMARK PROCESSING METHOD AND APPARATUS, INFORMATION TRANSMISSION METHOD, ELECTRONIC DEVICE AND STORAGE MEDIUM

(71) Applicant: Beijing Bytedance Network Technology Co., Ltd., Beijing (CN)

(72) Inventors: Yangruoying Kan, Beijing (CN); Zengyong Yin, Beijing (CN); Chaoyi Wu, Beijing (CN); Zongwu Jiang, Beijing (CN); Dongya Geng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 413 days.

(21) Appl. No.: 17/999,907

(22) PCT Filed: May 25, 2021

(86) PCT No.: PCT/CN2021/095849
§ 371 (c)(1),
(2) Date: Nov. 25, 2022

(87) PCT Pub. No.: WO2021/238931
PCT Pub. Date: Dec. 2, 2021

(65) Prior Publication Data
US 2023/0230193 A1 Jul. 20, 2023

(30) Foreign Application Priority Data
May 26, 2020 (CN) .......................... 202010457845.9

(51) Int. Cl.
*G06K 9/00* (2022.01)
*G06T 1/00* (2006.01)

(52) U.S. Cl.
CPC .................................. *G06T 1/0085* (2013.01)

(58) Field of Classification Search
CPC .............. G06T 1/0085; H04N 21/8358; H04N 21/4312; H04N 21/44
See application file for complete search history.

(56) References Cited

U.S. PATENT DOCUMENTS 6,330,672 B1 * 12/2001 Shur ..................... G06T 1/0028
380/54
7,123,740 B2 10/2006 McKinley et al.
(Continued)

FOREIGN PATENT DOCUMENTS

CN 101022550 A 8/2007
CN 104135670 A 11/2014
(Continued)

OTHER PUBLICATIONS

International Search Report and Written Opinion in PCT/CN2021/095849, mailed on Aug. 18, 2021, 10 pages.

*Primary Examiner* — Shervin K Nakhjavan
(74) *Attorney, Agent, or Firm* — Astute IP Law Group

(57) ABSTRACT

A video watermark processing method, an apparatus, an information transmitting method, an electronic device, and a storage medium are provided. The video data and the watermark data corresponding to the video data are separately acquired, so that a receiver of the video data may generate the target watermark according to the watermark data, and execute corresponding processing on the video data and the target watermark in response to the processing request for the video data.

20 Claims, 9 Drawing Sheets

(56) References Cited

U.S. PATENT DOCUMENTS

| | | | |
|---|---|---|---|
| 7,471,806 B2 * | 12/2008 | Kohiyama | H04N 7/163 |
| | | | 380/54 |
| 7,567,721 B2 | 7/2009 | Alattar et al. | |
| 7,587,601 B2 * | 9/2009 | Levy | H04N 21/4627 |
| | | | 713/168 |
| 8,885,870 B2 * | 11/2014 | Matsushita | G06T 1/0028 |
| | | | 382/100 |
| 8,978,060 B2 * | 3/2015 | Bakar | G06Q 30/0241 |
| | | | 725/32 |
| 9,756,289 B2 * | 9/2017 | Bickmore | H04N 7/1675 |
| 10,148,388 B1 * | 12/2018 | Louth | H04N 21/64322 |
| 11,019,407 B2 * | 5/2021 | Revital | H04N 21/8358 |
| 11,228,809 B2 * | 1/2022 | Loheide | H04N 21/25891 |
| 11,496,782 B2 * | 11/2022 | Stern | H04N 21/2668 |
| 11,540,029 B2 * | 12/2022 | Kilstein | H04N 21/23418 |
| 11,812,118 B2 * | 11/2023 | Park | H04N 21/43074 |
| 2003/0072467 A1 | 4/2003 | Brundage et al. | |
| 2007/0185840 A1 * | 8/2007 | Rhoads | H04N 21/42203 |
| | | | 348/E7.071 |
| 2014/0325550 A1 * | 10/2014 | Winograd | H04N 21/8456 |
| | | | 725/19 |
| 2016/0196631 A1 * | 7/2016 | Master | G06T 1/0085 |
| | | | 382/100 |
| 2017/0126631 A1 * | 5/2017 | Vikramaratne | H04L 63/0428 |
| 2017/0329943 A1 * | 11/2017 | Choi | H04L 63/0428 |
| 2022/0239993 A1 * | 7/2022 | Park | H04N 21/654 |

FOREIGN PATENT DOCUMENTS

| | | | | |
|---|---|---|---|---|
| CN | 105872854 A | | 8/2016 | |
| CN | 109525900 A | * | 3/2019 | H04N 21/4312 |
| CN | 110896484 A | | 3/2020 | |
| CN | 111698574 A | | 9/2020 | |
| WO | WO-03024020 A1 | * | 3/2003 | G06T 1/0085 |

* cited by examiner

VIDEO WATERMARK PROCESSING METHOD AND APPARATUS, INFORMATION TRANSMISSION METHOD, ELECTRONIC DEVICE AND STORAGE MEDIUM

This application is based on International Patent Application No. PCT/CN2021/095849, filed on May 25, 2021, which claims priority of China Patent application No. 202010457845.9, filed on May 26, 2020. All the aforementioned patent applications are hereby incorporated by reference in their entireties.

TECHNICAL FIELD

Embodiments of the present disclosure relate to a video watermark processing method, an apparatus, an information transmitting method, an electronic device and a storage medium.

BACKGROUND

With continuous development of user terminals, users may install various applications (APPs) on terminal devices, and these applications may provide the users with different types of services. For example, some applications may allow users to view video data.

SUMMARY

At least some embodiments of the present disclosure provide a video watermark processing method, which comprises: acquiring video data and acquiring watermark data corresponding to the video data; receiving a processing request for the video data; generating a target watermark according to the watermark data corresponding to the video data; and processing the video data and the target watermark in response to the processing request.

For example, in the method provided by some embodiments of the present disclosure, the watermark data corresponding to the video data comprises a plurality of watermark parameters. Generating the target watermark according to the watermark data corresponding to the video data comprises: determining a target watermark parameter from the plurality of watermark parameters corresponding to the video data; and generating the target watermark according to the target watermark parameter.

For example, in the method provided by some embodiments of the present disclosure, the processing request comprises at least one selected from a group consisting of: a video data display request, a video data transmitting request, a video data download request, and a video data forwarding request.

For example, in the method provided by some embodiments of the present disclosure, in the case where the processing request is the video data display request, processing the video data and the target watermark comprises: displaying the target watermark on a first display layer, and displaying the video data on a second display layer. The first display layer is above the second display layer.

For example, in the method provided by some embodiments of the present disclosure, the watermark data corresponding to the video data comprises a first parameter. Acquiring the watermark data corresponding to the video data comprises: acquiring the first parameter corresponding to the video data. The first parameter comprises at least one selected from a group consisting of: position information of a first watermark in the video data, valid time of the first watermark, watermark content of the first watermark, and size information of the first watermark.

For example, in the method provided by some embodiments of the present disclosure, the watermark data corresponding to the video data comprises a second parameter. Acquiring the watermark data corresponding to the video data comprises: acquiring the second parameter corresponding to the video data. The second parameter is used to determine watermark content of the target watermark.

For example, in the method provided by some embodiments of the present disclosure, the second parameter comprises at least one selected from a group consisting of: source information of the video data, content type of the video data, activity participation information of the video data, and switch information of a first watermark.

For example, in the method provided by some embodiments of the present disclosure, the switch information of the first watermark is determined according to permission information of an author or a platform of the video data.

For example, in the method provided by some embodiments of the present disclosure, generating the target watermark according to the watermark data corresponding to the video data comprises:

executing at least one selected from a group consisting of:
in the case where the switch information of the first watermark indicates that the first watermark is turned on, generating watermark content of the first watermark;
in the case where the source information of the video data meets a first preset condition, generating watermark content of a second watermark;
in the case where the content type of the video data meets a second preset condition, generating watermark content of a third watermark;
in the case where the activity participation information of the video data meets a third preset condition, generating watermark content of a fourth watermark;
determining the watermark content of the target watermark, according to at least one selected from a group consisting of the watermark content of the first watermark, the watermark content of the second watermark, the watermark content of the third watermark, and the watermark content of the fourth watermark; and
generating the target watermark according to the watermark content of the target watermark.

For example, in the method provided by some embodiments of the present disclosure, the source information of the video data comprises author information of the video data. The source information of the video data meeting the first preset condition comprises: the author information of the video data comprising author type.

For example, in the method provided by some embodiments of the present disclosure, the author type comprises at least one selected from a group consisting of: unicast author, exclusive author, and product author.

For example, in the method provided by some embodiments of the present disclosure, the watermark content of the second watermark comprises at least one selected from a group consisting of: unicast identification, exclusive identification, and product identification.

For example, in the method provided by some embodiments of the present disclosure, the content type of the video data meeting the second preset condition comprises: the content type of the video data comprising a preset type; and the watermark content of the third watermark comprising identification of the preset type.

For example, in the method provided by some embodiments of the present disclosure, the activity participation information of the video data meeting the third preset condition comprises: the activity participation information of the video data comprising preset activity identification; and the watermark content of the fourth watermark comprising the preset activity identification.

For example, the method provided by some embodiments of the present disclosure further comprises: updating the target watermark in the case where the target watermark is invalid. The target watermark that is updated comprises at least one watermark of the first watermark, the second watermark, the third watermark, and the fourth watermark except the target watermark.

For example, in the method provided by some embodiments of the present disclosure, the target watermark comprises the first watermark, and the watermark content of the first watermark comprises author identification of the video data.

For example, in the method provided by some embodiments of the present disclosure, the target watermark comprises at least one type of information below: author type identification information of the video data, where the author type identification information comprises at least one type of unicast identification, exclusive identification, and product identification; data source information of the video data, where the data source information has preset correspondence with content of the video data; and activity identification information of the video data, where the activity identification information has preset correspondence with the content of the video data.

For example, in the method provided by some embodiments of the present disclosure, the correspondence between the data source information and the content of the video data is determined by identifying content type of the video data in advance and based on an identification result; and/or the correspondence between the activity identification information and the content of the video data is determined by receiving setting information of the content of the video data in advance.

For example, in the method provided by some embodiments of the present disclosure, the watermark data corresponding to the video data comprises a plurality of watermark parameters and priority information of the plurality of watermark parameters. Generating the target watermark according to the watermark data corresponding to the video data comprises: determining a target watermark parameter or display effect information of the target watermark from the plurality of watermark parameters based on the priority information of the plurality of watermark parameters, and generating the target watermark based on the target watermark parameter or the display effect information.

For example, in the method provided by some embodiments of the present disclosure, the watermark data corresponding to the video data comprises at least one watermark parameter and valid condition information of the at least one watermark parameter. Generating the target watermark according to the watermark data corresponding to the video data comprises: determining whether to display a watermark corresponding to the at least one watermark parameter based on the valid condition information of the at least one watermark parameter, or, based on the valid condition information of the at least one watermark parameter, updating the target watermark based on other valid watermark parameter after a watermark parameter on which the target watermark is based is invalid.

For example, in the method provided by some embodiments of the present disclosure, the valid condition information comprises validity period information or user permission information.

For example, in the method provided by some embodiments of the present disclosure, the user permission information comprises at least one of permission information of an author of the video data and permission information of player user of the video data.

For example, in the method provided by some embodiments of the present disclosure, the watermark data comprises at least one type of information below for indicating watermark content: text information, static image information, and dynamic image information.

For example, in the method provided by some embodiments of the present disclosure, acquiring the video data and acquiring the watermark data corresponding to the video data comprises: making a first terminal acquire the video data from a server and acquire the watermark data corresponding to the video data. Processing the video data and the target watermark comprises: making the first terminal display the video data and the target watermark.

For example, the method provided by some embodiments of the present disclosure further comprises: making the first terminal receive indication information from the server. The indication information is used to indicate whether the video data comprises a watermark. Generating the target watermark according to the watermark data corresponding to the video data comprises: in the case where the indication information indicates that the video data does not comprise a watermark, making the first terminal generate the target watermark according to the watermark data corresponding to the video data.

For example, the method provided by some embodiments of the present disclosure further comprises: making the first terminal receive a display command of preset information; and making the first terminal control hiding the target watermark or reduce an amount of the target watermark, according to the display command.

For example, in the method provided by some embodiments of the present disclosure, the display command comprises at least one selected from a group consisting of: a command to display preset control icon, a command to display prompt information, a command to display text information, and a command to display graphic information.

For example, in the method provided by some embodiments of the present disclosure, the preset control icon is configured to control at least one of play volume, play brightness, and play process of the video data.

For example, in the method provided by some embodiments of the present disclosure, the display command comprises a gesture control instruction, and the gesture control instruction is used to control at least one of play volume, play brightness, and play process of the video data.

For example, in the method provided by some embodiments of the present disclosure, acquiring the video data and acquiring the watermark data corresponding to the video data comprises: making a server acquire the video data and the watermark data corresponding to the video data from a second terminal device. In the case where the processing request is a video data transmitting request, processing the video data and the target watermark comprises: making the server respectively send the video data and the target watermark to a first terminal.

For example, in the method provided by some embodiments of the present disclosure, acquiring the video data and acquiring the watermark data corresponding to the video data comprises: making a server receive the video data and indication information from a video cloud, where the indication information is used to indicate whether the video data comprises a watermark; and in the case where the indication information indicates that the video data does not comprise a watermark, making the server generate the watermark data corresponding to the video data.

For example, the method provided by some embodiments of the present disclosure further comprises: making the server store the video data and the watermark data, respectively; and making the server establish correspondence between the video data and the watermark data.

For example, in the method provided by some embodiments of the present disclosure, in the case where the processing request is a video data download request or a video data forwarding request, processing the video data and the target watermark comprises: making the server send the video data containing the target watermark to the first terminal.

At least some embodiments of the present disclosure further provide a video watermark processing method, which comprises: making a server receive an acquiring request from a first terminal, where the acquiring request is used to request to acquire video data; making the server determine a watermark parameter of at least one watermark corresponding to the video data, according to the acquiring request; making the server determine a target watermark to be displayed currently, according to a display condition of the at least one watermark; and making the server send a response message carrying the target watermark and the video data to the first terminal.

For example, in the method provided by some embodiments of the present disclosure, making the server determine the target watermark to be displayed currently, according to the display condition of the at least one watermark, comprises: in the case where switch information of a first watermark indicates that the first watermark is turned on, the target watermark to be displayed currently comprising the first watermark; in the case where source information of the video data meets a first preset condition, the target watermark to be displayed currently comprising a second watermark; in the case where content type of the video data meets a second preset condition, the target watermark to be displayed currently comprising a third watermark; and in the case where activity participation information of the video data meets a third preset condition, the target watermark to be displayed currently comprising a fourth watermark.

For example, in the method provided by some embodiments of the present disclosure, making the server send the response message carrying the target watermark and the video data to the first terminal comprises: making the server send the video data containing the target watermark to the first terminal; or, making the server respectively send the watermark parameter of the target watermark and the video data to the first terminal.

For example, in the method provided by some embodiments of the present disclosure, making the server send the video data containing the target watermark to the first terminal comprises: in the case where the acquiring request comprises a video data download request or a video data forwarding request, making the server send the video data containing the target watermark to the first terminal. Making the server respectively send the watermark parameter of the target watermark and the video data to the first terminal comprises: in the case where the acquiring request comprises a video data display request or a video data transmitting request, making the server respectively send the watermark parameter of the target watermark and the video data to the first terminal.

At least some embodiments of the present disclosure further provide a watermark processing method, which comprises: acquiring target information and acquiring watermark data corresponding to the target information; receiving a processing request for the target information; generating a target watermark according to watermark data corresponding to the target information; and processing the target information and the target watermark in response to the processing request.

For example, in the method provided by some embodiments of the present disclosure, the target information comprises at least one selected from a group consisting of: video data, text information, image information, and audio information.

At least some embodiments of the present disclosure further provide an information transmitting method, which comprises: making a server store first target information and second target information, where the first target information and the second target information both contain same target information, the same target information in the first target information is embedded with watermark information, and the same target information and watermark parameter information are stored separately in the second target information; making the server receive an acquiring request from a first terminal, where the acquiring request is used to request to acquire the same target information; and making the server select information to be sent to a first terminal from the first target information and the second target information according to a type of the acquiring request, and sending selected information to the first terminal.

For example, in the method provided by some embodiments of the present disclosure, making the server select the information to be sent to the first terminal from the first target information and the second target information according to the type of the acquiring request, and sending the selected information to the first terminal, comprises: making the server send the second target information to the first terminal in response to the type of the acquiring request being a play request; or, making the server send the first target information to the first terminal in response to the type of the acquiring request being a download request or a forwarding request.

At least some embodiments of the present disclosure further provide a video watermark processing apparatus, which comprises: a receiving module, configured to acquire video data and acquire watermark data corresponding to the video data, and further configured to receive a processing request for the video data; a generating module, configured to generate a target watermark according to watermark data corresponding to the video data; and a responding module, configured to process the video data and the target watermark in response to the processing request.

At least some embodiments of the present disclosure further provide a watermark processing apparatus, which comprises: a receiving module, configured to receive an acquiring request from a first terminal, where the acquiring request is used to request to acquire target information; a first determining module, configured to determine a first parameter of one or more watermarks corresponding to the target information according to the acquiring request; a second determining module, configured to determine a target watermark to be displayed currently according to a display condition of the one or more watermarks; and a sending module, configured to send a response message carrying the target watermark and the target information to the first terminal.

For example, in the apparatus provided by some embodiments of the present disclosure, the target information comprises at least one selected from a group consisting of: video data, text information, image information, and audio information.

At least some embodiments of the present disclosure further provide an electronic device, which comprises: one or more processors; and a storage apparatus, configured to store one or more programs. When executed by the one or more processors, the one or more programs make the one or more processors implement the video watermark processing method according to any embodiments of the present disclosure, or implement the watermark processing method according to any embodiments of the present disclosure, or implement the information transmitting method according to any embodiments of the present disclosure.

At least some embodiments of the present disclosure further provide a computer-readable storage medium. A computer program is stored on the computer-readable storage medium. When executed by a processor, the computer program implements the video watermark processing method according to any embodiments of the present disclosure, or implements the watermark processing method according to any embodiments of the present disclosure, or implements the information transmitting method according to any embodiments of the present disclosure.

BRIEF DESCRIPTION OF THE DRAWINGS

The above and other features, advantages and aspects of various embodiments of the present disclosure will become more apparent when taken in conjunction with the accompanying drawings and with reference to the following detailed implements. Throughout the drawings, the same or similar reference numbers refer to the same or similar elements. It should be understood that the drawings are schematic and that the components and elements are not necessarily drawn to scale.

DETAILED DESCRIPTION

Figure 1:
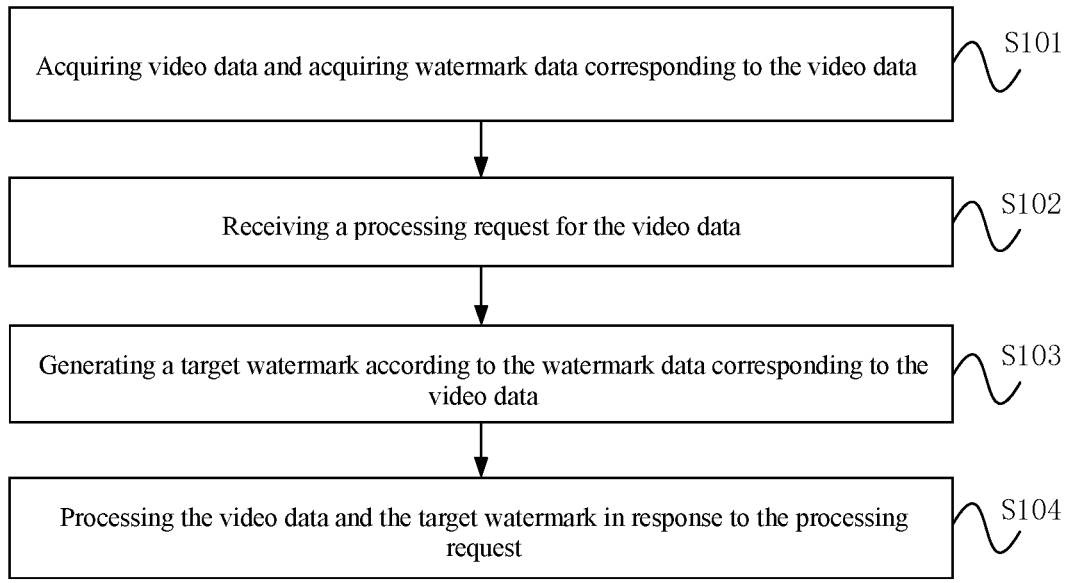
FIG. 1 is a flow chart of a video watermark processing method according to an embodiment of the present disclosure.

Embodiments of the present disclosure will be described in more detail below with reference to the accompanying drawings. Although certain embodiments of the present disclosure are illustrated in the accompanying drawings, it should be understood that the present disclosure can be implemented in various forms, and should not be interpreted as limited to the embodiments set forth herein. Instead, these embodiments are provided for a more thorough and complete understanding of the present disclosure. It should be understood that the accompanying drawings and the embodiments of the present disclosure are only for illustrative purposes, and are not intended to limit the protection scope of the present disclosure.

It should be understood that various steps described in the method implementations of the present disclosure may be executed in different orders and/or in parallel. Furthermore, the method implementations may include additional steps and/or omit execution of the steps illustrated. The scope of the present disclosure will not be limited in this regard.

The term "including" and variants thereof used herein are open including, that is, "including but not limited to". The term "based on" is "at least partially based on". The term "one embodiment" represents "at least one embodiment". The term "another embodiment" represents "at least one other embodiment"; and the term "some embodiments" means "at least some embodiments". Relevant definitions of other terms will be given in the following descriptions.

It should be noted that concepts such as "first", "second" and the like as mentioned in the present disclosure are only used to distinguish apparatuses, modules or units, but not to define orders or interdependence of functions executed by these apparatuses, modules or units.

It should be noted that modifications of "one" and "a plurality of" as mentioned in the present disclosure is exemplary rather than restrictive. Those skilled in the art should understand that unless otherwise explicitly specified in the context, it should be understood as "one or more".

The names of messages or information interacted between a plurality of apparatuses according to the implementations of the present disclosure are only used for illustrative purposes, and are not used to limit the scope of these messages or information.

In order to avoid illegal infringement of copyright of video data, before a server sends the video data to a terminal device, the server may embed a watermark into the video data and send a video data stream added with the watermark to the terminal device. Thus, the terminal device may display the watermark while displaying the video data. However, when sharpness of the video data decreases, sharpness of the watermark will also decrease.

At least some embodiments of the present disclosure provide a video watermark processing method, and the video watermark processing method includes: acquiring video data and acquiring watermark data corresponding to the video data; receiving a processing request for the video data; generating a target watermark according to watermark data corresponding to the video data; and processing the video data and the target watermark in response to the processing request. At least some embodiments of the present disclosure further provide an information transmitting method, a video watermark processing apparatus, an electronic device, and a storage medium corresponding to the above-described video watermark processing method.

In the video watermark processing method provided by the embodiments of the present disclosure, the video data and the watermark parameter corresponding to the video data are separately acquired/received, so that a receiver of the video data may generate the target watermark according to the watermark parameter, and execute corresponding processing on the video data and the target watermark in response to the processing request for the video data. Since the video data and the corresponding watermark parameter of the video data are separate, that is to say, there is no watermark parameter or watermark added to the video data, sharpness of the target watermark corresponding to the video data is not affected by sharpness of the video data, that is to say, when sharpness of the video data decreases, sharpness of the target watermark does not decrease accordingly. In addition, a size of the target watermark is limited by a target watermark parameter, and is not affected by the video data being zoomed in or out, so when the video data is played or displayed in full screen, the target watermark may not become larger accordingly, thereby avoiding the problem that the target watermark may overflow the display screen and cannot be displayed completely.

FIG. 1 is a flow chart of a video watermark processing method according to an embodiment of the present disclosure; this embodiment may be applicable to the case of video watermark processing in a client; the method may be executed by a video watermark processing apparatus; the apparatus may be implemented by software and/or hardware; and the apparatus may be configured in an electronic device, for example, a mobile terminal, specifically including a mobile phone, a computer or a tablet personal computer. Or, this embodiment may be applicable to the case of video watermark processing in a server; the method may be executed by a video watermark processing apparatus; the apparatus may be implemented by software and/or hardware; and the apparatus may be configured in an electronic device, for example, a server.

As illustrated in FIG. 1, the method may include step S101 to step S104 below.

S101: acquiring video data and acquiring watermark data corresponding to the video data.

Figure 2:
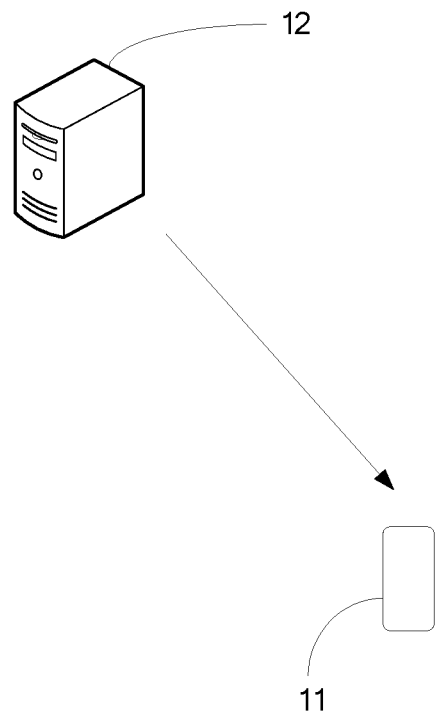
FIG. 2 is a schematic diagram of an application scenario according to an embodiment of the present disclosure.

When the method is applied to the client, as illustrated in FIG. 2, the server 12 respectively sends the video data and the watermark data corresponding to the video data to a first terminal 11, and accordingly, the first terminal 11 receives the video data and the watermark data corresponding to the video data, separately. That is to say, the server 12 may simultaneously send the video data and the watermark data corresponding to the video data to the first terminal 11, the video data and the watermark data corresponding to the video data are separated, for example, the video data and the watermark data corresponding to the video data are respectively located in different fields or portions. Or, the server 12 may sequentially send the video data and the watermark data corresponding to the video data to the first terminal 11, and at this time, the transmission order of the video data and the watermark data is not limited.

For example, the watermark data includes at least one type of information below for indicating watermark content: text information, static image information, and dynamic image information. The embodiment neither limits specific text information, static image information and dynamic image information, nor limits the image format of static image information and dynamic image information.

S102: receiving a processing request for the video data.

For example, the processing request includes at least one selected from a group consisting of: a video data display request, a video data transmitting request, a video data download request, and a video data forwarding request.

Figure 3:
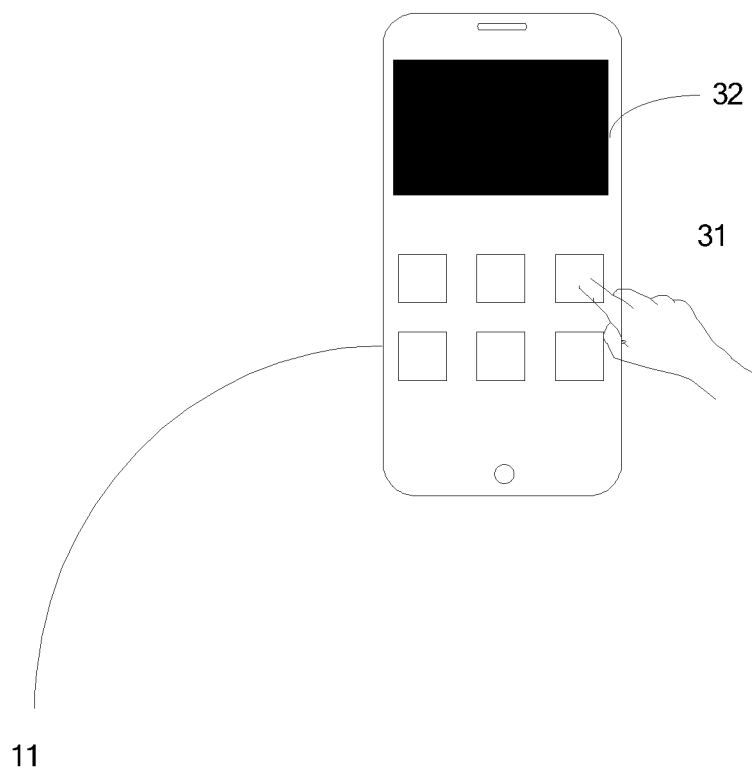
FIG. 3 is a schematic diagram of a user interface according to an embodiment of the present disclosure.

For example, when the method is applied to the client, as illustrated in FIG. 2, the first terminal 11 may display a thumbnail of the video data. As illustrated in FIG. 3, a user interface of the first terminal 11 may display thumbnails of a plurality of pieces of video data, and 31 may represent any one of the thumbnails of the plurality of pieces of video data. When a user of the first terminal 11 operates the thumbnail 31, the first terminal 11 may receive a video data display request from the user according to the operation; and the video data display request indicates that the user requests to play or display the video data in a player 32. It may be understood that this embodiment does not specifically define the user interface of the first terminal 11; in addition, the user's operations on the thumbnail 31 are not limited to operations such as clicking, long pressing, double clicking, etc., but may also be other operations. In addition, a mode in which the user controls displaying or playing of the video data is not limited to the operation on the video data thumbnails, but may include other modes, for example, gesture control.

S103: generating a target watermark according to the watermark data corresponding to the video data.

For example, a piece of watermark data corresponding to one piece of video data may include one or more watermark parameters.

When the method is applied to the client, the first terminal 11 may generate a target watermark according to one or more watermark parameters corresponding to the video data. When the watermark data corresponding to the video data includes one watermark parameter, the first terminal 11 may generate a target watermark according to the watermark parameter.

For example, when the watermark data corresponding to the video data includes a plurality of watermark parameters, generating a target watermark according to the watermark data corresponding to the video data includes: determining a target watermark parameter from the plurality of watermark parameters corresponding to the video data; and generating the target watermark based on the target watermark parameter.

For example, the first terminal 11 may determine the target watermark parameter from the plurality of watermark parameters corresponding to the video data, and generate the target watermark according to the target watermark parameter.

S104: processing the video data and the target watermark in response to the processing request.

For example, when the processing request is the video data display request, processing the video data and the target watermark includes: displaying the target watermark on a first display layer, and displaying the video data on a second display layer. The first display layer is above the second display layer.

For example, after the first terminal 11 determines the target watermark parameter from the plurality of watermark parameters corresponding to the video data and generates the target watermark based on the determined target watermark parameter, the first terminal 11 may respond to the processing request, for example, the video data display request. Specifically, the first terminal 11 may display the target watermark on the first display layer of the player, and display the video data on the second display layer of the player. The first display layer is above the second display layer. That is to say, from a perspective of the user watching the video, the target watermark drifts above the video data.

Figure 4:
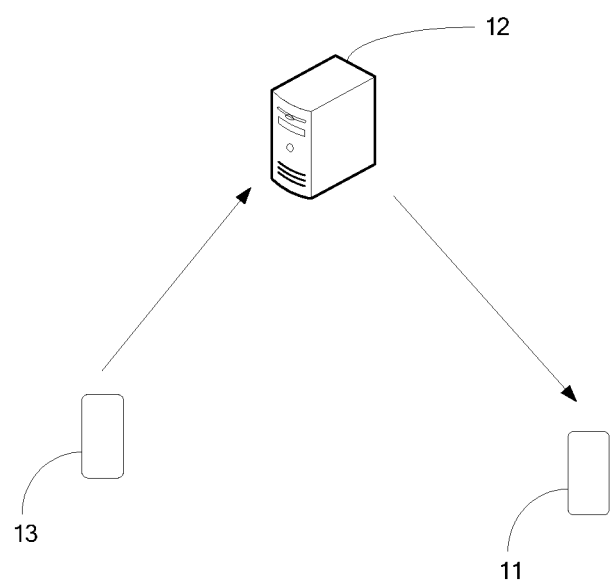
FIG. 4 is a schematic diagram of another application scenario according to an embodiment of the present disclosure.

When the method is applied to the server, as illustrated in FIG. 4, a user of a second terminal 13 may be an author of the video data. After the author completes the video data, the user may send the video data and the watermark data corresponding to the video data to the server 12 through the second terminal 13, so that the server 12 may receive the video data and the watermark data corresponding to the video data. When the watermark data corresponding to the video data includes one watermark parameter, the server 12 may generate a target watermark according to the watermark parameter. When the watermark data corresponding to the video data includes a plurality of watermark parameters, the server 12 may determine a target watermark parameter from the plurality of watermark parameters corresponding to the video data, and generate the target watermark based on the determined target watermark parameter. When the server 12 receives the processing request for the video data from the first terminal 11, for example, the video data transmitting request, the server 12 responds to the video data transmitting request, specifically, the server 12 respectively sends the video data and the target watermark to the first terminal 11, or the server 12 respectively sends the video data and the target watermark parameter to the first terminal 11.

In the video watermark processing solution provided by the embodiments of the present disclosure, the video data and the watermark data corresponding to the video data are separately acquired/received, so that the receiver of the video data may generate the target watermark according to the watermark data, and perform corresponding processing on the video data and the target watermark in response to the processing request for the video data. Since the video data and the watermark data corresponding to the video data are separate, that is to say, there is no watermark data or watermark added to the video data, sharpness of the target watermark corresponding to the video data is not affected by sharpness of the video data, that is to say, when sharpness of the video data decreases, sharpness of the target watermark does not decrease accordingly.

For example, in some examples, the watermark data corresponding to the video data includes a first parameter. In this case, receiving the watermark data corresponding to the video data may include: receiving the first parameter corresponding to the video data. The first parameter includes at least one of: position information of the first watermark in the video data, valid time of the first watermark, watermark content of the first watermark, and size information of the first watermark.

When the method is applied to the client, as illustrated in FIG. 2, when receiving the watermark data corresponding to the video data from the server 12, the first terminal 11 may specifically receive the first parameter corresponding to the video data from the server 12, and the first parameter may include at least one of: position information of the first watermark in the video data, valid time of the first watermark, watermark content of the first watermark, and size information of the first watermark. The position information of the first watermark in the video data, the valid time of the first watermark, the watermark content of the first watermark, and the size information of the first watermark may be configured by the server 12 for the video data, or may also be configured by the author of the video data for the video data, or may also be configured by a backstage staff of the server 12 for the video data.

When the method is applied to the server, as illustrated in FIG. 4, when receiving the watermark data corresponding to the video data from the second terminal 13, the server 12 may specifically receive the first parameter corresponding to the video data from the second terminal 13, and the first parameter may include at least one of: position information of the first watermark in the video data, valid time of the first watermark, watermark content of the first watermark, and size information of the first watermark. The position information of the first watermark in the video data, the valid time of the first watermark, the watermark content of the first watermark, and the size information of the first watermark may be configured by the author of the video data, for example, may be configured by the user of the second terminal 13 for the video data.

In the video watermark processing solution provided by the embodiments of the present disclosure, the video data and the watermark data corresponding to the video data are separately acquired/received, so that the receiver of the video data may generate the target watermark according to the watermark data. The size of the target watermark is limited by the target watermark parameter, and is not affected by the video data being zoomed in or out, so when the video data is played or displayed in full screen, the target watermark may not become larger accordingly, thereby avoiding the problem that the target watermark may overflow the display screen and cannot be displayed completely.

Hereinafter, it is schematically illustrated by taking that the user of the second terminal 13 configures the first parameter for the video data as an example.

Figure 5:
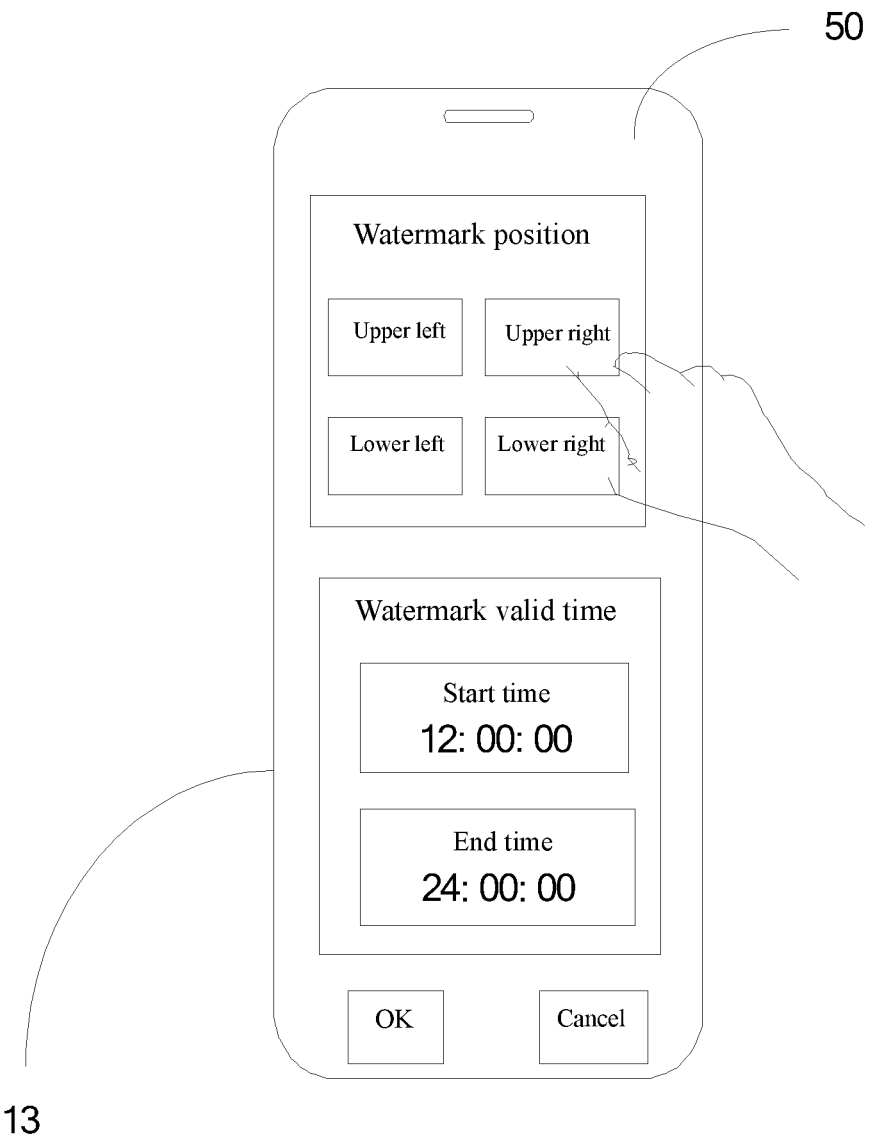
FIG. 5 is a schematic diagram of another user interface according to an embodiment of the present disclosure.

As illustrated in FIG. 5, 50 represents a user interface of the second terminal 13; the user interface 50 includes setting items of the first parameter, for example, a "watermark position" setting item and a "watermark valid time" setting item. The user may set the position information of the watermark in the video data in the "watermark position" setting item. For example, the user may select the watermark to be displayed at a lower left corner, an upper left corner, a lower right corner or an upper right corner, etc. of the video data. For example, the user may also set start time and end time of the watermark in the "watermark valid time" setting item, that is to say, the watermark is valid between the start time and the end time. It may be understood that the setting items of the first parameter included in the user interface 50 are not limited to the "watermark position" setting item and the "watermark valid time" setting item illustrated in FIG. 5, which are only schematically illustrated here. For example, in other embodiments, the user interface 50 may also include a "watermark content" setting item, for example, text information, static image information, and/or dynamic image information, etc. specifically indicated by the "watermark content". When the user of the second terminal 13 clicks OK in the user interface 50, the second terminal 13 may send the first parameter to the server 12.

It may be understood that the setting item of the first parameter illustrated in FIG. 5 may be a setting item of one certain first parameter; when the video data corresponds to a plurality of first parameters, the setting item of each first parameter in the plurality of first parameters may be similar to the setting item illustrated in FIG. 5, and no details will be repeated here. It may be understood that in the present disclosure, each first parameter usually corresponds to one watermark.

For example, in some examples, the watermark data corresponding to the video data includes a second parameter, and in this case, receiving the watermark data corresponding to the video data may include: receiving the second parameter corresponding to the video data. The second parameter is used to determine the watermark content of the target watermark.

For example, the second parameter includes at least one of: source information of the video data, content type of the video data, activity participation information of the video data, and switch information of the first watermark.

When the method is applied to the client, for example, as illustrated in FIG. 2, when the first terminal 11 receives the watermark data corresponding to the video data from the server 12, the first terminal 11 may specifically receive the second parameter corresponding to the video data from the server 12.

When the method is applied to the server, as illustrated in FIG. 4, when receiving the watermark data corresponding to the video data from the second terminal 13, the server 12 may specifically receive the second parameter corresponding to the video data from the second terminal 13.

The second parameter includes at least one of: source information of the video data, content type of the video data, activity participation information of the video data, and switch information of the first watermark.

For example, while sending the video data to the server 12, the second terminal 13 may also send the second parameter to the server 12; and the second parameter may be configured by the user of the second terminal 13. For example, the second terminal 13 may also display other user interface different from the user interface 50. In the other user interface, the user of the second terminal 13 may input information such as identification information of the user, content type of the video data, and activity participation information of the video data, etc. The activity participation information of the video data may specifically include identification of the activity in which the video data participates. The user's input mode is not limited in this embodiment, for example, it may be manually input, or may also be selected according to options provided in other user interface. In addition, the other user interface may also display a first watermark switch. When the user controls the first watermark switch to be turned on, it means that the user, namely the author of the video data, agrees to take the user information such as his/her own nickname as the watermark content of the first watermark. When the user controls the first watermark switch to be turned off, it means that the user, namely the author of the video data, does not expect to take the user information such as his/her own nickname as the watermark content of the first watermark.

It may be understood that the embodiments of the present disclosure are not limited to the user of the second terminal 13 configuring information such as source information of the video data, content type of the video data, activity participation information of the video data, switch information of the first watermark, etc. For example, the server 12 or the backstage staff of the server 12 may also configure information such as source information of the video data, content type of the video data, activity participation information of the video data, switch information of the first watermark, etc. Or, some are configured by the user of the second terminal 13, and some are configured by the server 12 or the backstage staff of the server 12.

For example, after receiving the video data, the server 12 or the backstage staff of the server 12 may determine the content type of the video data by analyzing the video data. And/or, the server 12 may store correspondence between identification information of the second terminal 13 and a user identification of the second terminal 13. When receiving the video data from the second terminal 13 or other device, the server 12 may determine source information of the video data according to identification information of the second terminal 13 or other device, that is, which author or platform the video data comes from. And/or, the server 12 may also store permission information of a plurality of authors, for example, some authors are permitted to take the user information such as his/her own nickname as the watermark content, and some authors are not permitted to take the user information such as his/her own nickname as the watermark content; after determining which author or platform the video data comes from, the server 12 may also determine whether to turn on the first watermark switch according to the permission information of the author or platform. That is, switch information of the first watermark may be determined according to the permission information of the author or platform of the video data.

For example, the second parameter is used to determine watermark content of the target watermark. Hereinafter, a process of determining the watermark content of the target watermark and a process of generating the target watermark according to the watermark content of the target watermark will be described in detail in combination with specific embodiments.

Figure 6:
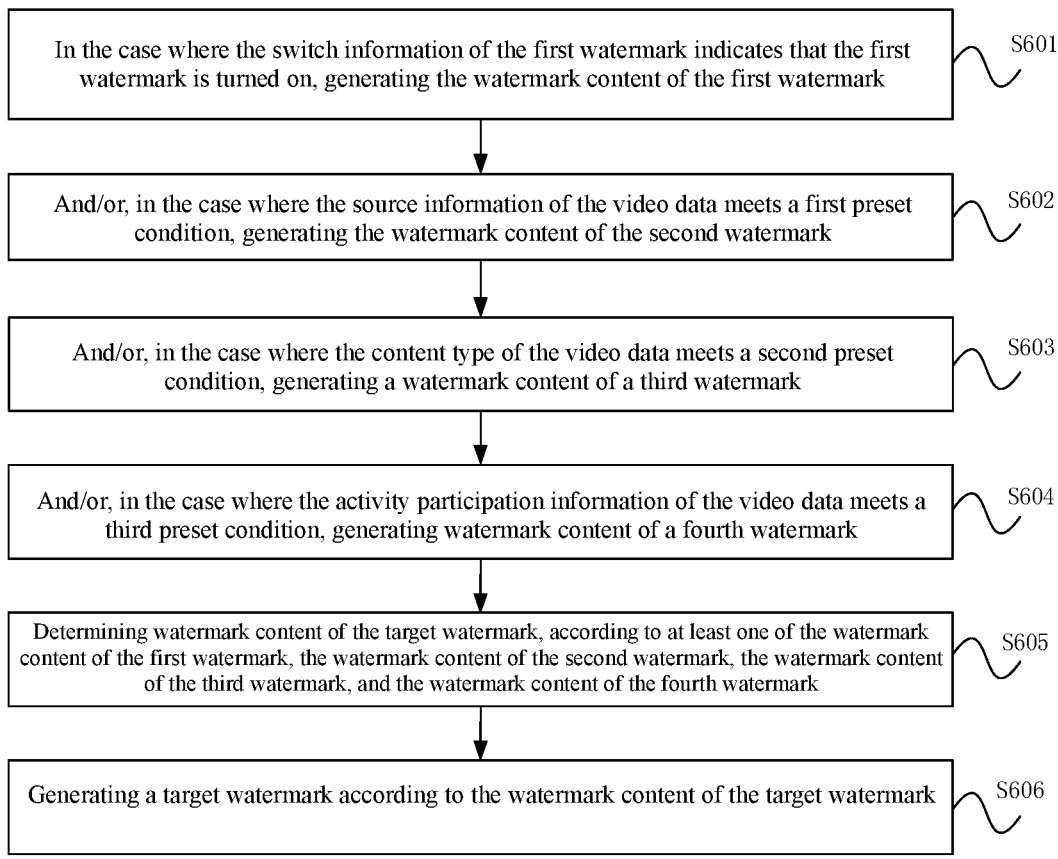
FIG. 6 is a flow chart of another video watermark processing method according to an embodiment of the present disclosure.

Specifically, generating a target watermark according to the watermark data corresponding to the video data may include step S601 to step S606 as illustrated in FIG. 6.

S601: in the case where the switch information of the first watermark indicates that the first watermark is turned on, generating the watermark content of the first watermark.

Specifically, it is schematically illustrated by taking that the first terminal 11 receives the second parameter corresponding to the video data from the server 12, and determines the watermark content of the target watermark according to the second parameter as an example. The process that the server 12 receives the second parameter corresponding to the video data from the second terminal 13 and determines the watermark content of the target watermark according to the second parameter is similar to the process that the first terminal 11 determines the watermark content of the target watermark, and no details will be repeated here.

For example, the first terminal 11 receives the second parameter corresponding to the video data from the server 12, and the second parameter includes the switch information of the first watermark. The switch information of the first watermark may specifically be a binary value; when the binary value is 1, it indicated that the first watermark is turned on; and when the binary value is 0, it indicates that the first watermark is turned off. If the first terminal 11 determines that the switch information of the first watermark indicates that the first watermark is on, the first terminal 11 generates the watermark content of the first watermark; and the watermark content of the first watermark includes author identification of the video data, for example, the author nickname.

S602: and/or, in the case where the source information of the video data meets a first preset condition, generating the watermark content of the second watermark.

For example, in this embodiment, the source information of the video data includes: author information of the video data. The source information of the video data meeting the first preset condition includes: the author information of the video data including author type.

For example, the author type includes at least one of: unicast author, exclusive author, and product author.

For example, the server 12 may receive video data from different authors. According to copyright of the video data created by the author, the author may be divided into unicast author, exclusive author, and product author. The video data created by the unicast author may be serial video data such as TV plays, movies, entertainment programs, etc.; a service provider of the server 12 may buy up the copyright of the video data created by the unicast author. The product author is specifically used to represent a producer of the video data; the backstage staff of the server 12 may set product author information or acquire the product author information from other device. The video data created by an exclusive author may be non-serial video data such as short videos; and the exclusive author may provide the video data to the service provider of the server 12, but not provide the video data to other service providers.

When a unicast author, an exclusive author, or a product author provides video data to the server 12, the unicast author, the exclusive author or the product author may also send the author information to the server 12. When receiving the author information of the video data from the server 12, the first terminal 11 determines whether the author information includes a preset author type, for example, unicast author, exclusive author, or product author.

For example, the watermark content of the second watermark includes at least one of: unicast identification, exclusive identification, and product identification.

For example, if the author type included in the author information is unicast author, the first terminal 11 generates the watermark content of the second watermark, and the watermark content of the second watermark includes unicast identification. For example, the watermark content of the second watermark is "platform A unicast", "platform A" indicates that the video data comes from the server of "platform A", and "unicast" indicates that the author of the video data is a unicast author, that is, the video data is only broadcast on platform A.

Similarly, if the author type included in the author information is exclusive author, the first terminal 11 generates the watermark content of the second watermark, and the watermark content of the second watermark includes exclusive identification. If the author type included in the author information is a product author, the first terminal 11 generates the watermark content of the second watermark, and the watermark content of the second watermark includes product identification. It may be understood that specific information of the unicast identification, the exclusive identification and the product identification is not limited in this embodiment, for example, it may be text information of "unicast", or it may also be other icons or dynamic pictures, as long as the unicast identification, the exclusive identification, and the product identification can be distinguished and identified.

S603: and/or, in the case where the content type of the video data meets a second preset condition, generating a watermark content of a third watermark.

For example, the content type of the video data meeting a second preset condition includes: the content type of the video data including a preset type; and the watermark content of the third watermark including identification of a preset type.

For example, after receiving the video data, the server 12 may judge the content type of the video data, for example, judge whether the content type of the video data includes a preset type, and the preset type may specifically be a car type, an entertainment type, etc. If the server 12 determines that the preset type of the received video data is a car type, the server 12 may send the content type of the video data to the first terminal 11. Specifically, if the server 12 determines that the preset type of the received video data is a car type, the video data has a picture including a car, and more than 20% of the content in the latest posted articles of the author of the video data as calculated by the server 12 is car content, then the server 12 may send the content type of the video data to the first terminal 11. When determining that the content type of the video data is a car type, the first terminal 11 generates the watermark content of the third watermark; and the watermark content of the third watermark includes identification of car type; for example, the watermark content of the third watermark is car type identification.

S604: and/or, in the case where the activity participation information of the video data meets a third preset condition, generating watermark content of a fourth watermark.

For example, the activity participation information of the video data meeting the third preset condition includes: the activity participation information of the video data including preset activity identification; and the watermark content of the fourth watermark includes preset activity identification.

It may be seen from the above-described embodiments that the author of the video data may configure whether the video data participates in a certain activity, for example, a B Prize activity. Configuration information of the author may be sent to the server 12, and the server 12 may send the activity participation information of the video data to the first terminal 11. When the first terminal 11 determines that the activity participation information of the video data includes preset activity identification, for example, identification of the B Prize activity, according to the activity participation information of the video data, the first terminal 11 generates the watermark content of the fourth watermark, and the watermark content of the fourth watermark includes "B Prize".

S605: determining watermark content of the target watermark according to at least one of the watermark content of the first watermark, the watermark content of the second watermark, the watermark content of the third watermark, and the watermark content of the fourth watermark.

According to the above-described S601 to S604, it can be known that "the switch information of the first watermark indicating that the first watermark is turned on", "the source information of the video data meeting the first preset condition", "the content type of the video data meeting the second preset condition", and "the activity participation information of the video data meeting the third preset condition" are respectively different valid conditions.

When one valid condition in the plurality of valid conditions is true, the watermark content generated when the valid condition is true may be taken as the watermark content of the target watermark.

When a plurality of valid conditions in the plurality of valid conditions are true, the video data corresponds to a plurality of watermarks. For example, when "the switch information of the first watermark indicating that the first watermark is turned on", "the source information of the video data meeting the first preset condition", "the content type of the video data meeting the second preset condition", and "the activity participation information of the video data meeting the third preset condition" are all true, the video data may correspond to 4 items of watermark content, for example, the watermark content of the first watermark, the watermark content of the second watermark, the watermark content of the third watermark, and the watermark content of the fourth watermark. In this case, the first terminal 11 may determine the watermark content of the target watermark according to at least one of the watermark content of the first watermark, the watermark content of the second watermark, the watermark content of the third watermark, and the watermark content of the fourth watermark. For example, the watermark content of the target watermark may be one or more of the watermark content of the first watermark, the watermark content of the second watermark, the watermark content of the third watermark, and the watermark content of the fourth watermark.

A specific method for determining the watermark content of the target watermark from the watermark content of the first watermark, the watermark content of the second watermark, the watermark content of the third watermark, and the watermark content of the fourth watermark is not limited in this embodiment.

In a possible mode, the watermark content of the first watermark, the watermark content of the second watermark, the watermark content of the third watermark, and the watermark content of the fourth watermark each correspond to a priority. The watermark content of the target watermark may be a watermark content with a highest priority, or may also be watermark content of the first N watermarks among a sequence obtained by sorting the watermark content of the first watermark, the watermark content of the second watermark, the watermark content of the third watermark, and the watermark content of the fourth watermark according to priority.

In another possible mode, the watermark content of the first watermark, the watermark content of the second watermark, the watermark content of the third watermark, and the watermark content of the fourth watermark each correspond to valid time; and the watermark content of the target watermark may be watermark content of one or more watermarks whose valid time meets certain conditions.

S606: generating the target watermark according to the watermark content of the target watermark.

Further, the first terminal 11 may generate the target watermark according to the watermark content of the target watermark.

As illustrated in Table 1 below, the video data corresponds to 4 watermark parameters; and the 4 watermark parameters are respectively a watermark parameter of the first watermark, a watermark parameter of the second watermark, a watermark parameter of the third watermark, and a watermark parameter of the fourth watermark. The watermark parameter of the first watermark may include position information of the first watermark in the video data, valid time of the first watermark, watermark content of the first watermark, and size information of the first watermark. The watermark parameter of the second watermark may include position information of the second watermark in the video data, valid time of the second watermark, watermark content of the second watermark, and size information of the second watermark. The watermark parameter of the third watermark may include position information of the third watermark in the video data, valid time of the third watermark, watermark content of the third watermark, and size information of the third watermark. The watermark parameter of the fourth watermark may include position information of the fourth watermark in the video data, valid time of the fourth watermark, watermark content of the fourth watermark, and size information of the fourth watermark.

It may be understood that correspondence as described in Table 1 may be stored in the server 12, or may also be issued by the server 12 to the first terminal 11. For example, when the first terminal 11 determines that the watermark content of the target watermark is the watermark content of the first watermark, the first terminal 11 may generate the target watermark according to the watermark content of the target watermark, for example, the target watermark is the first watermark, for example, a watermark containing the author's nickname.

It may be understood that this embodiment does not limit the amount of watermark parameters corresponding to a same video data. The correspondence illustrated in Table 1 is only schematic illustration. In addition, valid conditions of each watermark parameter are not limited to the valid conditions as described above.

TABLE 1

| Video data | | | |
|---|---|---|---|
| Watermark parameters of the first watermark | | | |
| Position information of the first watermark in the video data | Valid time of the first watermark | Watermark content of the first watermark | Size information of the first watermark |
| Watermark parameters of the second watermark | | | |
| Position information of the second watermark in the video data | Valid time of the second watermark | Watermark content of the second watermark | Size information of the second watermark |
| Watermark parameters of the third watermark | | | |
| Position information of the third watermark in the video data | Valid time of the third watermark | Watermark content of the third watermark | Size information of the third watermark |
| Watermark parameters of the fourth watermark | | | |
| Position information of the fourth watermark in the video data | Valid time of the fourth watermark | Watermark content of the fourth watermark | Size information of the fourth watermark |

In addition, the method further includes: updating the target watermark when the target watermark is invalid. The updated target watermark includes at least one of the first watermark, the second watermark, the third watermark, and the fourth watermark except the target watermark.

For example, in the case where the target watermark is the first watermark, after the first watermark is invalid, the target watermark may be updated to one or more of the second watermark, the third watermark, and the fourth watermark. Specific update rules are not limited here. For example, a watermark with the highest priority among the second watermark, the third watermark, and the fourth watermark may be taken as the updated target watermark, or a watermark with earliest valid time among the second watermark, the third watermark, and the fourth watermark may be taken as the updated target watermark.

In one possible implementation, the target watermark includes a first watermark; and watermark content of the first watermark includes author identification of the video data.

For example, if the first watermark has the highest priority among the first watermark, the second watermark, the third watermark, and the fourth watermark, then the first watermark may be taken as the target watermark, and the watermark content of the first watermark includes the author identification of the video data, for example, the author nickname.

In another possible implementation, the target watermark includes at least one type of information below: author type identification information of the video data, where the author type identification information includes at least one of unicast identification, exclusive identification, and product identification; data source information of the video data, where the data source information has preset correspondence with the content of the video data; activity identification information of the video data, where the activity identification information has preset correspondence with the content of the video data.

For example, the target watermark includes at least one of the author type identification information of the video data, the data source information of the video data, and the activity identification information of the video data.

The author type identification information may specifically include at least one of the unicast identification, the exclusive identification, and the product identification as described above.

For example, there is preset correspondence between the data source information and the content of the video data. The correspondence between the data source information and the content of the video data is determined by identifying the content type of the video data in advance and based on an identification result. For example, when the server 12 determines that the preset type of the received video data is the car type, the server 12 may mark the car type watermark on the car type video data sent by the author, that is, the server 12 may establish correspondence between the author identification and the car type watermark.

Correspondence between the activity identification information and the content of the video data is determined by receiving setting information of the content of the video data in advance. For example, when the server 12 determines that the activity participation information of the video data includes preset activity identification, for example, identification of the B Prize activity, according to the activity participation information of the video data, the server 12 may establish correspondence between the video data and the "B Prize".

For example, the watermark data corresponding to the video data includes a plurality of watermark parameters and priority information of the plurality of watermark parameters. Generating the target watermark according to the watermark data corresponding to the video data includes: determining the target watermark parameter or display effect information of the target watermark from the plurality of watermark parameters based on the priority information of the plurality of watermark parameters, and generating a target watermark based on the target watermark parameter or the display effect information.

For example, as illustrated in Table 1, the video data may correspond to a plurality of watermark parameters, for example, the watermark parameter of the first watermark, the watermark parameter of the second watermark, the watermark parameter of the third watermark, and the watermark parameter of the fourth watermark. The watermark parameter of the first watermark, the watermark parameter of the second watermark, the watermark parameter of the third watermark, and the watermark parameter of the fourth watermark each correspond to its own priority information. When the target watermark is generated according to the watermark parameter corresponding to the video data, according to the priority information respectively corresponding to the watermark parameter of the first watermark, the watermark parameter of the second watermark, the watermark parameter of the third watermark, and the watermark parameter of the fourth watermark, the target watermark parameter may be determined from the watermark parameters of the 4 watermarks, or the display effect information of the target watermark may be determined from the watermark parameters of the 4 watermarks. The display effect information may include at least one of: display color and display special effect. When there are a plurality of target watermark parameters, the display effect information may also include an arrangement mode of the plurality of target watermarks determined by the plurality of target watermark parameters. Further, the target watermark is generated according to the target watermark parameter or the display effect information.

For example, the watermark data corresponding to the video data includes at least one watermark parameter and valid condition information of the at least one watermark parameter. Generating the target watermark according to the watermark data corresponding to the video data includes: determining whether to display the watermark corresponding to the at least one watermark parameter based on the valid condition information of the at least one watermark parameter, or updating the target watermark based on other valid watermark parameter after the watermark parameter on which the target watermark is based is invalid, based on the valid condition information of the at least one watermark parameter. The valid condition information includes validity period information or user permission information.

For example, as illustrated in Table 1, the video data corresponds to 4 watermark parameter; each watermark parameter includes valid time; the valid time may also be denoted as validity period information; the validity period information may be one type of the valid condition information, and in other embodiments, the valid condition information may also include user permission information. The user permission information may specifically be information of whether the author of the video data has permission to take the author's nickname as the watermark content, or may also be information of whether the player user of the video data has permission to remove or not display the screen watermark. That is, the user permission information includes at least one of permission information of the author of the video data and permission information of the player user of the video data.

For example, the video data corresponds to 4 watermark parameters; each watermark parameter includes valid condition information; and the valid condition information includes validity period information, or user permission information. When the target watermark is generated according to the watermark parameter corresponding to the video data, it is determined whether to generate or display the watermark corresponding to the watermark parameter based on the valid condition information of the watermark parameter. For example, if the valid time of the first watermark has not expired, and the valid time of the second watermark, the valid time of the third watermark, and the valid time of the fourth watermark have all expired, then the watermark parameter of the first watermark may be taken as the watermark parameter of the target watermark, and further, the target watermark may be generated according to the watermark parameter of the target watermark. After the first watermark is invalid, the target watermark may be updated to one or more of the second watermark, the third watermark, and the fourth watermark. The specific update rules are not limited here, for example, the watermark with the highest priority among the second watermark, the third watermark, and the fourth watermark may be taken as the updated target watermark, or the watermark with the earliest valid time among the second watermark, the third watermark, and the fourth watermark may be taken as the updated target watermark.

In the video watermark processing solution provided by the embodiments of the present disclosure, after the target watermark is invalid, the target watermark is updated to other watermark, so that a valid watermark may be displayed on the video data when the video data is played or displayed, which not only improves flexibility of watermark display, but also better protects copyright of the video data.

Figure 7:
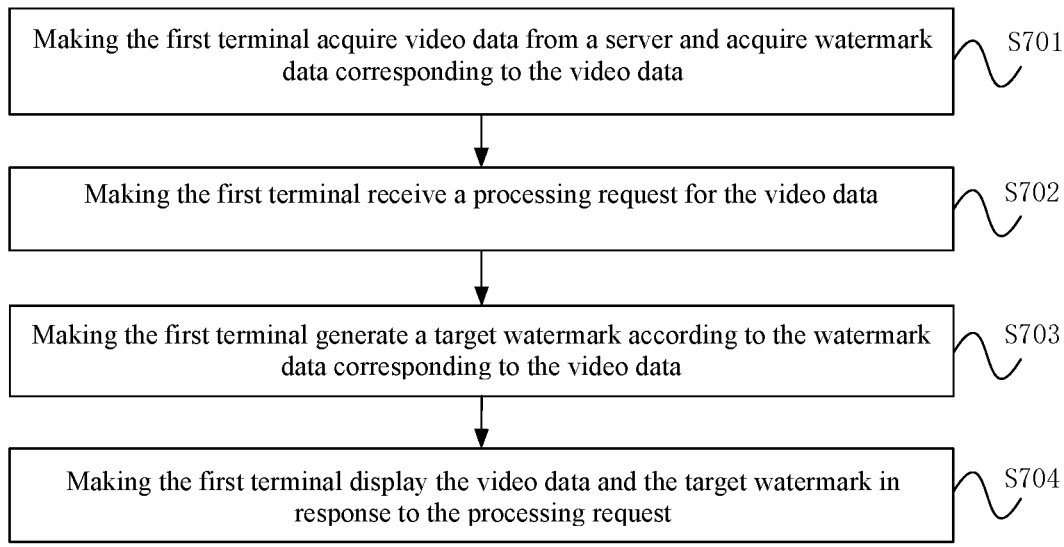
FIG. 7 is a flow chart of another video watermark processing method according to an embodiment of the present disclosure.

FIG. 7 is a flow chart of another video watermark processing method according to an embodiment of the present disclosure. On the basis of the above-described embodiments, this embodiment further specifically illustrates the video watermark processing method. As illustrated in FIG. 7, the method according to this embodiment is applied to the first terminal and may include step S701 to step S704 below.

S701: making the first terminal acquire video data from a server and acquire watermark data corresponding to the video data.

The server 12 may simultaneously send the video data and the watermark data corresponding to the video data to the first terminal 11. The video data and the watermark data corresponding to the video data are separated, for example, the video data and the watermark data corresponding to the video data are respectively located in different fields or portions. Or, the server 12 may sequentially send the video data and the watermark data corresponding to the video data to the first terminal 11, and at this time, the transmission order of the video data and the watermark data is not limited, so that the first terminal 11 may receive the video data and watermark data corresponding to the video data separately.

S702: making the first terminal receive a processing request for the video data.

For example, as illustrated in FIG. 3, when the user of the first terminal 11 operates the thumbnail 31, the first terminal 11 may receive the user's video data display request according to the operation.

S703: making the first terminal generate a target watermark according to the watermark data corresponding to the video data.

For example, watermark data corresponding to one piece of video data may include one or more watermark parameters; and the first terminal 11 may generate a target watermark according to the one or more watermark parameters corresponding to the video data. When the watermark data corresponding to the video data includes one watermark parameter, the first terminal 11 may generate a target watermark according to the watermark parameter. When the watermark data corresponding to the video data includes a plurality of watermark parameters, the first terminal 11 may determine the target watermark parameter from the plurality of watermark parameters corresponding to the video data, and generate the target watermark according to the target watermark parameter.

For example, the method further includes: making the first terminal receive indication information from the server. The indication information is used to indicate whether the video data includes a watermark. Generating a target watermark according to the watermark data corresponding to the video data includes: if the indication information indicates that the video data does not include a watermark, generating, by the first terminal, the target watermark according to the watermark data corresponding to the video data.

For example, the server 12 may also send the indication information to the first terminal 11; and the indication information may be issued at a same time with the video data, or issued sequentially. The indication information is used to indicate whether the video data includes a watermark. When the first terminal 11 determines that the indication information indicates that the video data includes a watermark, no additional watermark is added to the video data to avoid printing watermarks repeatedly. When the first terminal 11 determines that the indication information indicates that the video data does not include a watermark, the first terminal 11 generates a target watermark according to the watermark data corresponding to the video data.

S704: making the first terminal display the video data and the target watermark in response to the processing request.

For example, after the first terminal 11 determines the target watermark parameter from a plurality of watermark parameters corresponding to the video data, and generates the target watermark based on the determined target watermark parameter, the first terminal 11 may respond to the processing request, for example, the video data display request. Specifically, the first terminal 11 may display the target watermark on the first display layer of the player, and display the video data on the second display layer of the player. The first display layer is above the second display layer. That is to say, from a perspective of the user watching the video, the target watermark drifts above the video data.

In the video watermark processing solution provided by the embodiments of the present disclosure, the video data and the watermark data corresponding to the video data are separately acquired/received, so that the receiver of the video data may generate the target watermark according to the watermark data, and execute corresponding processing on the video data and the target watermark in response to the processing request for the video data. Since the video data and the watermark data corresponding to the video data are separate, that is to say, there is no watermark data or watermark added to the video data, sharpness of the target watermark corresponding to the video data is not affected by sharpness of the video data, that is to say, when sharpness of the video data decreases, sharpness of the target watermark is not decrease accordingly. In addition, the size of the target watermark is limited by the target watermark parameter, and is not affected by the video data being zoomed in or out, so when the video data is played or displayed in full screen, the target watermark may not become larger accordingly, thereby avoiding the problem that the target watermark may overflow the display screen and cannot be displayed completely.

Figure 8:
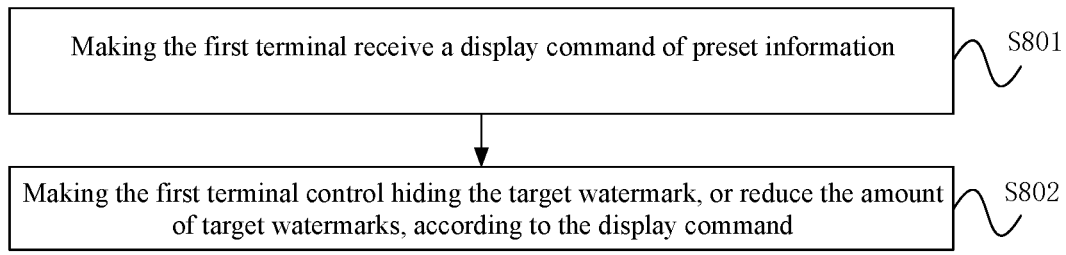
FIG. 8 is a flow chart of another video watermark processing method according to an embodiment of the present disclosure.

On the basis of the embodiment illustrated in FIG. 7, the method may further include step S801 and step S802 illustrated in FIG. 8.

S801: making the first terminal receive a display command of preset information.

For example, the user of the first terminal 11 may control the first terminal 11 to display the preset information; and a specific control mode is not specifically limited here. The preset information may specifically be information such as preset control icon, prompt information, text information, graphic information, etc. Specifically, the first terminal 11 may receive the display command of the preset information. For example, display command includes at least one of: a command to display preset control icon, a command to display prompt information, a command to display text information, and a command to display graphic information.

Specifically, after receiving the display command of the preset information, the first terminal 11 may display the preset information on the user interface of the first terminal 11, for example, display information such as the preset control icon, the prompt information, the text information, or the graphic information, etc.

S802: making the first terminal control hiding the target watermark, or reduce the amount of target watermarks, according to the display command.

However, the display position of the preset information and the display position of the target watermark of the video data may conflict, and the so-called conflict may be overlapping, partial overlapping, etc. Therefore, when receiving the display command of the preset information, the first terminal 11 may control hiding the target watermark of the video data according to the display command, or the first terminal 11 may also reduce the amount of displayed target watermarks according to the display command, when there is a plurality of target watermarks.

For example, the preset control icon is configured to control at least one of play volume, play brightness, and play process of the video data.

Figure 9:
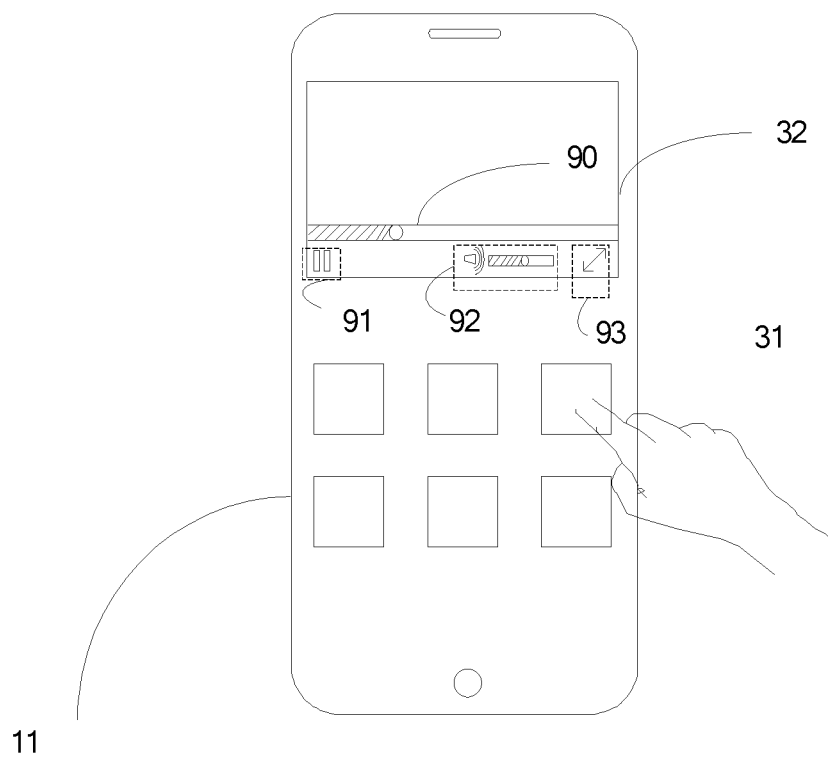
FIG. 9 is a schematic diagram of another user interface according to an embodiment of the present disclosure.

For example, the preset control icon may be a player control illustrated in FIG. 9. The player control 90 is configured to control the play process of the video data; the player control 91 is configured to control pause or play of the video data; the player control 92 is configured to control play volume of the video data; and the player control 93 is configured to control full screen play of the video data.

For example, the display command includes a gesture control instruction; and the gesture control instruction is used to control at least one of play volume, play brightness, and play process of the video data.

For example, the user of the first terminal 11 may also control at least one of play volume, play brightness, and play process of the video data by gesture control.

In the video watermark processing solution provided by the embodiments of the present disclosure, the first terminal controls hiding the target watermark of the video data, or reduces the amount of target watermarks, according to the received display command of the preset information, which may avoid conflict between the display position of the preset information and the display position of the target watermark of the video data, thereby avoiding the target watermark from shielding the preset information, and optimizing the display effect of the preset information.

Figure 10:
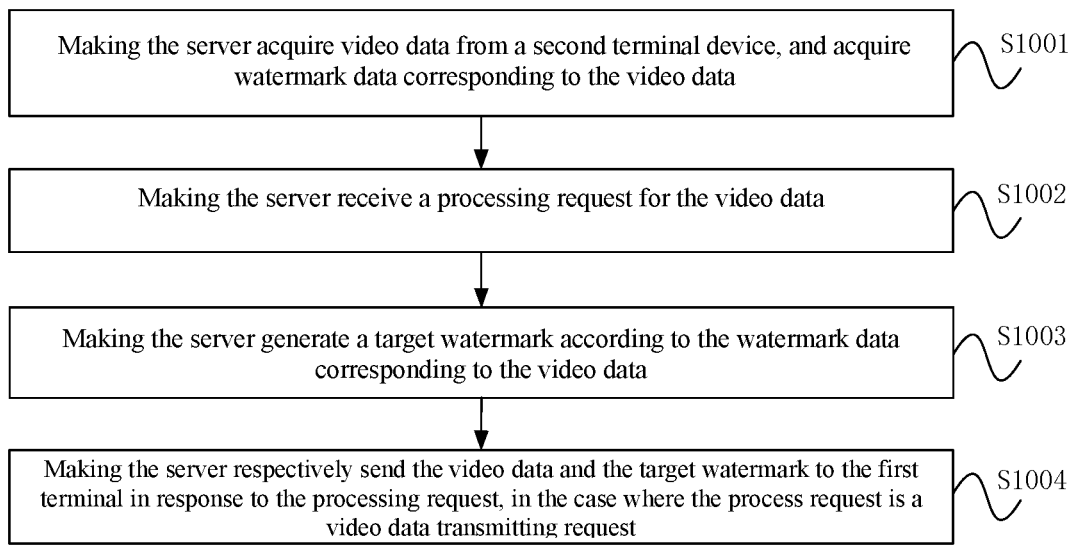
FIG. 10 is a flow chart of another video watermark processing method according to an embodiment of the present disclosure.

FIG. 10 is a flow chart of another video watermark processing method according to an embodiment of the present disclosure. On the basis of the above-described embodiments, this embodiment further specifically illustrates the video watermark processing method. As illustrated in FIG. 10, the method according to this embodiment is applied to a server, and may include step S1001 to step S1004 below.

S1001: making the server acquire video data from a second terminal device, and acquire watermark data corresponding to the video data.

As illustrated in FIG. 4, a user of the second terminal 13 may be an author of the video data. After the author completes the video data, the user may send the video data and the watermark data corresponding to the video data to the server 12 through the second terminal 13, so that the server 12 may receive the video data and the watermark data corresponding to the video data.

S1002: making the server receive a processing request for the video data.

S1003: making the server generate a target watermark according to the watermark data corresponding to the video data.

When the watermark data corresponding to the video data includes one watermark parameter, the server 12 may generate a target watermark according to the watermark parameter. When the watermark data corresponding to the video data includes a plurality of watermark parameters, the server 12 may determine a target watermark parameter from the plurality of watermark parameters corresponding to the video data, and generate a target watermark based on the determined target watermark parameter.

S1004: making the server respectively send the video data and the target watermark to the first terminal in response to the processing request, in the case where the processing request is a video data transmitting request.

When the server 12 receives the processing request for the video data from the first terminal 11, for example, the video data transmitting request, the response of the server 12 to the video data transmitting request may specifically be: sending, by the server 12, the video data and the target watermark respectively to the first terminal 11, or making the server 12 respectively send the video data and the target watermark parameter to the first terminal 11.

In addition, when the processing request is a video data download request or a video data forwarding request, executing the processing on the video data and the target watermark includes: sending, by the server, the video data containing the target watermark to the first terminal.

For example, when the second terminal 13 sends the video data to the server 12, the server 12 may store video data embedded with a watermark and video data not embedded with a watermark; in addition, the server 12 also stores the watermark parameter. When the server 12 receives a video data play request of the first terminal 11, the server 12 may issue the video data not embedded with a watermark and the target watermark parameter to the first terminal 11, so that the first terminal 11 may display the watermark on the display layer above the video data when playing the video data. If the first terminal 11 needs to download or forward the video data, then the server 12 receives a video data download request or a video data forwarding request from the first terminal 11; and at this time, the server 12 issues the video data embedded with the watermark to the first terminal 11.

In the video watermark processing solution provided by the embodiments of the present disclosure, the video data and the watermark data corresponding to the video data are separately acquired/received, so that the receiver of the video data may generate the target watermark according to the watermark data, and execute corresponding processing on the video data and the target watermark in response to the processing request for the video data. Since the video data and the watermark data corresponding to the video data are separate, that is to say, there is no watermark parameter or watermark added to the video data, sharpness of the target watermark corresponding to the video data is not affected by sharpness of the video data, that is to say, when sharpness of the video data decreases, sharpness of the target watermark does not decrease accordingly. In addition, the size of the target watermark is limited by the target watermark parameter, and is not affected by the video data being zoomed in or out, so when the video data is played or displayed in full screen, the target watermark does not become larger accordingly, thereby avoiding the problem that the target watermark may overflow the display screen and cannot be displayed completely.

Figure 11:
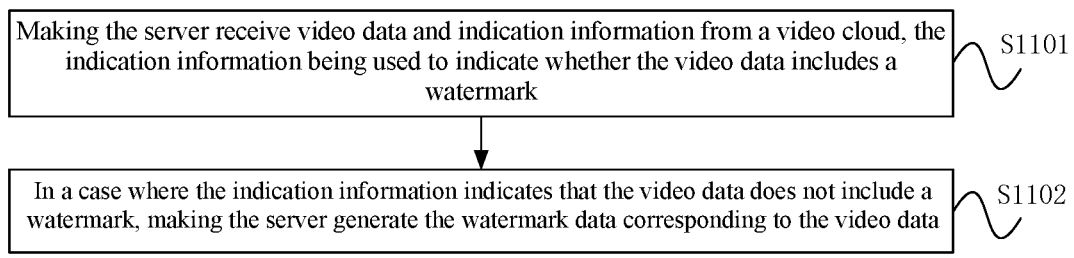
FIG. 11 is a flow chart of another video watermark processing method according to an embodiment of the present disclosure.

FIG. 11 is a flow chart of another video watermark processing method according to an embodiment of the present disclosure. On the basis of the above-described embodiments, this embodiment further specifically illustrates the video watermark processing method. As illustrated in FIG. 11, the method according to this embodiment is applied to a server, and may include step S1001 to step S1002 below.

S1101: making the server receive video data and indication information from a video cloud, where the indication information is used to indicate whether the video data includes a watermark.

Figure 12:
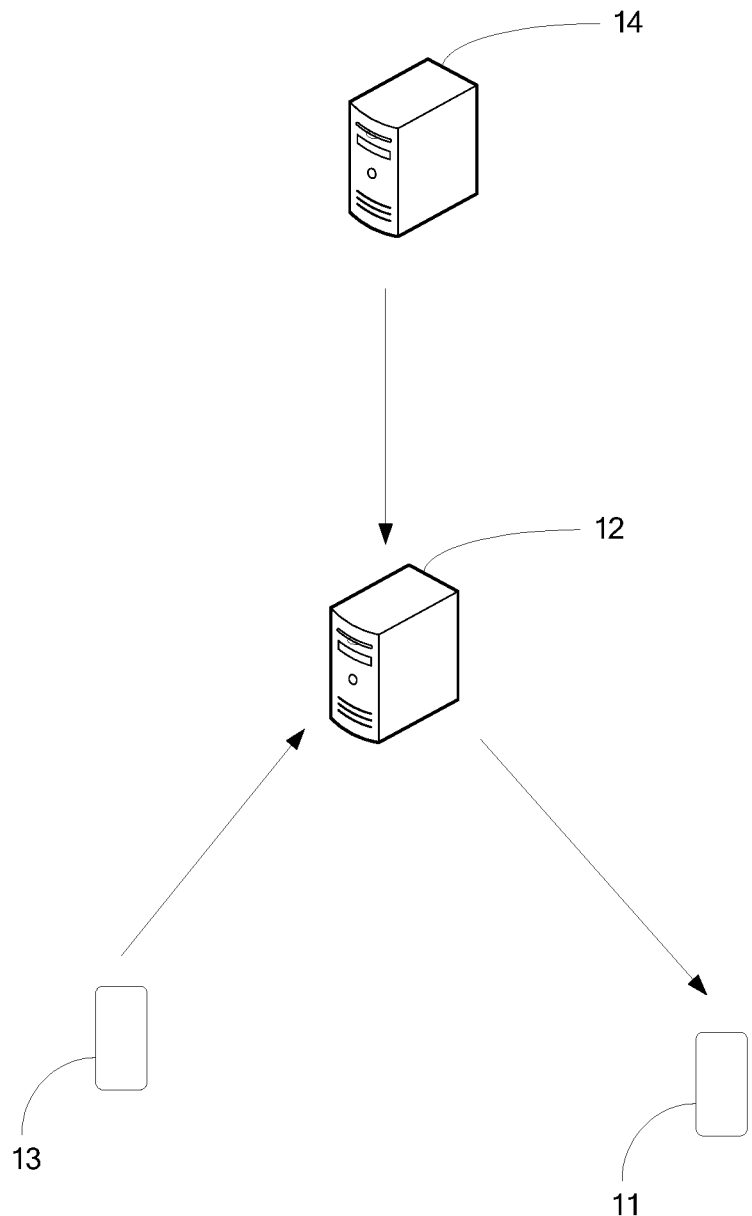
FIG. 12 is a schematic diagram of another user interface according to an embodiment of the present disclosure.

As illustrated in FIG. 12, the server 12 may not only receive the video data from the second terminal 13, but also receive the video data from the video cloud 14. That is to say, the video data in the server 12 may be not only from the user of the second terminal 13, but also from the video cloud 14. The video data sent by the video cloud 14 to the server 12 may carry a watermark, or carry no watermark. In addition, the video cloud 14 may also clean the watermark in the video data.

In this embodiment, the video cloud 14 may send the video data and the indication information to the server 12; and the indication information is used to indicate whether the video data includes a watermark.

S1102: if the indication information indicates that the video data does not include a watermark, making the server generate the watermark data corresponding to the video data.

If the indication information indicates that the video data does not include a watermark, the server 12 may generate the watermark data corresponding to the video data.

Figure 13:
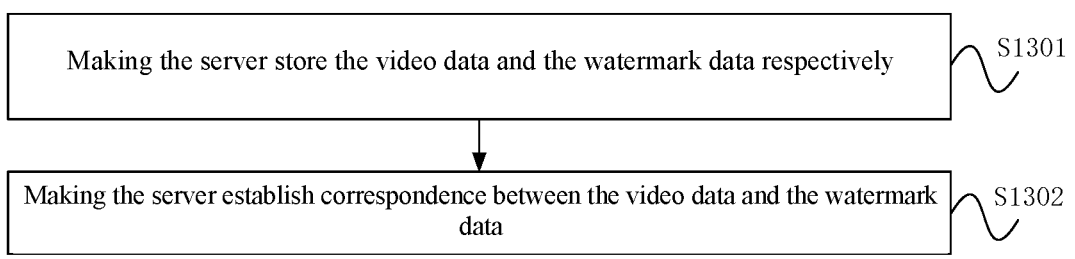
FIG. 13 is a flow chart of another video watermark processing method according to an embodiment of the present disclosure.

In addition, on the basis of FIG. 10 and/or FIG. 11, the method further includes step S1301 and step S1302 as illustrated in FIG. 13.

S1301: making the server store the video data and the watermark data, respectively.

S1302: making the server establish correspondence between the video data and the watermark data.

For example, the video data may correspond to a plurality of watermark parameters (i.e., the watermark data includes a plurality of watermark parameters); the server 12 may store the video data and the plurality of watermark parameters corresponding to the video data, respectively; the server 12 may also establish correspondence between the video data and the plurality of watermark parameters, as illustrated in Table 1 above, and no details will be repeated here.

Figure 14:
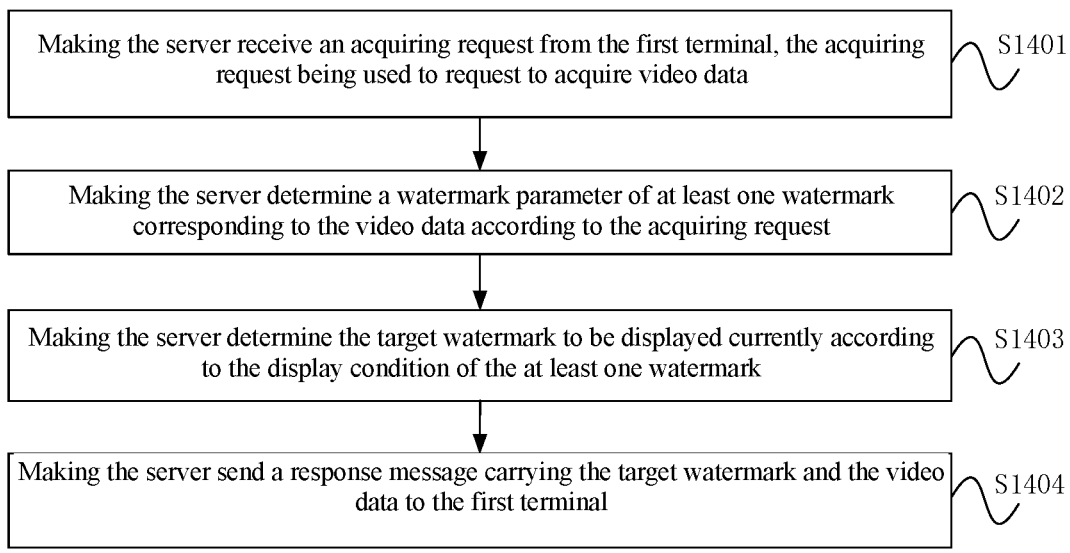
FIG. 14 is a flow chart of another video watermark processing method according to an embodiment of the present disclosure.

FIG. 14 is a flow chart of another video watermark processing method according to an embodiment of the present disclosure. The video watermark processing method is further illustrated specifically. As illustrated in FIG. 14, the method according to this embodiment is applied to a server, and may include step S1401 to step S1404 below.

S1401: making the server receive an acquiring request from the first terminal, where the acquiring request is used to request to acquire video data.

For example, after receiving a user's video data display request, the first terminal 11 may send an acquiring request to the server 12, and the acquiring request is used to request to acquire the video data. Accordingly, the server 12 receives the acquiring request from the first terminal 11.

S1402: making the server determine a watermark parameter of at least one watermark corresponding to the video data, according to the acquiring request.

For example, the server 12 may determine the watermark parameter of one or more watermarks corresponding to the video data according to the correspondence in Table 1.

S1403: making the server determine the target watermark to be displayed currently, according to the display condition of the at least one watermark.

For example, the server 12 may determine the target watermark to be displayed currently, according to the display conditions of the first watermark, the second watermark, the third watermark, and the fourth watermark, that is, according to the valid conditions as described above.

For example, making the server determine the target watermark to be displayed currently, according to the display conditions of the one or more watermarks, includes: if the switch information of the first watermark indicates that the first watermark is turned on, then the target watermark to be displayed currently includes the first watermark; if the source information of the video data meets the first preset condition, then the target watermark to be displayed currently includes the second watermark; if the content type of the video data meets the second preset condition, then the target watermark to be displayed currently includes the third watermark; and if the activity participation information of the video data meets the third preset condition, then the target watermark to be displayed currently includes the fourth watermark.

For example, if the switch information of the first watermark indicates that the first watermark is turned on, the server 12 determines that the target watermark to be displayed currently includes the first watermark, for example, the author's nickname. If the source information of the video data meets the first preset condition, for example, the author information of the video data includes author type such as unicast author, exclusive author, or product author, the server 12 determines that the target watermark to be displayed currently includes the second watermark, for example, a "unicast" watermark, an "exclusive" watermark, or a "product" watermark. If the content type of the video data is a preset type, for example, a car type, the server 12 determines that the target watermark to be displayed currently includes the third watermark. If the activity participation information of the video data includes preset activity identification, the server 12 determines that the target watermark to be displayed currently includes the fourth watermark.

"The switch information of the first watermark indicating that the first watermark is turned on", "the source information of the video data meeting the first preset condition", "the content type of the video data meeting the second preset condition", and "the activity participation information of the video data meeting the third preset condition" are different valid conditions, respectively.

When one valid condition of the plurality of valid conditions is true, the target watermark may be the watermark when the valid condition is true.

When a plurality of valid conditions in the plurality of valid conditions are true, for example, when "the switch information of the first watermark indicating that the first watermark is turned on", "the source information of the video data meeting the first preset condition", "the content type of the video data meeting the second preset condition" and "the activity participation information of the video data meeting the third preset condition" are all true, the target watermark includes the first watermark, the second watermark, the third watermark, and the fourth watermark.

In some embodiments, one or more of the first watermark, the second watermark, the third watermark, and the fourth watermark may be selected as the target watermark. The selecting method may be based on priority information of the first watermark, the second watermark, the third watermark, and the fourth watermark, or may also be based on valid time of the first watermark, the second watermark, the third watermark, and the fourth watermark. For example, the first watermark has the highest priority; and when the switch information of the first watermark indicates that the first watermark is turned on, the target watermark is the first watermark.

S1404: making the server send a response message carrying the target watermark and the video data to the first terminal.

In one possible implementation, making the server send a response message carrying the target watermark and the video data to the first terminal includes: making the server send the video data containing the target watermark to the first terminal.

For example, the server 12 may add the target watermark to the video data and send a video data stream to the first terminal 11, and the video data stream already includes the target watermark. When receiving the video data stream, the first terminal 11 may play the video data containing the target watermark after decoding the video data stream.

In another possible implementation, making the server send a response message carrying the target watermark and the video data to the first terminal includes: making the server respectively send the watermark parameter of the target watermark and the video data to the first terminal.

For example, the server 12 issues the second parameter of the target watermark, namely the watermark parameter of the target watermark, and the video data separately to the first terminal 11. For example, the server 12 may carry the watermark parameter of the target watermark and the video data respectively in different messages, and issue the different messages respectively to the first terminal 11. Or, the server 12 may carry the watermark parameter of the target watermark and the video data respectively in a same message, but the watermark parameter of the target watermark and the video data are respectively located in different fields of the message, and further, the server 12 issues the message to the first terminal 11.

After receiving the watermark parameter of the target watermark, the first terminal 11 generates the target watermark according to the watermark parameter of the target watermark. Further, when playing the video data, the first terminal 11 displays the target watermark on the first display layer of the player, and displays the video data on the second display layer of the player, and the first display layer is above the second display layer.

For example, in some examples, in the case where the foregoing acquiring request includes a video data download request or a video data forwarding request, the server may be made to send the video data containing the target watermark to the first terminal. It should be noted that the embodiments of the present disclosure include, but are not limited thereto. For example, in the case where the foregoing acquiring request includes a video data download request or a video data forwarding request, the server may also be made to send the watermark parameter of the target watermark and the video data respectively to the first terminal. For example, in some examples, in the case where the foregoing acquiring request includes a video data display request or a video data transmitting request, the server may be made to send the watermark parameter of the target watermark and the video data respectively to the first terminal. It should be noted that the embodiments of the present disclosure include, but are not limited thereto. For example, in the case where the foregoing acquiring request includes a video data display request or a video data transmitting request, the server may also be made to send the video data containing the target watermark to the first terminal.

In the video watermark processing solution provided by the embodiments of the present disclosure, the server receives an acquiring request from the first terminal, determines the first parameter of one or more watermarks corresponding to the video data according to the acquiring request, determines the target watermark to be displayed currently according to display conditions of the one or more watermarks, and further sends a response message carrying the target watermark and the video data to the first terminal. The response message may be the video data containing the target watermark, or may also be the watermark parameter of the target watermark and the video data, which improves flexibility of the server to send the target watermark and the video data to the first terminal.

It may be understood that the above-described embodiment introduces the video data watermark processing method by taking the video data as an example. In addition, the method may also be applied to watermark processing of text information, graphic information, audio information, etc.

For example, this embodiment may further provide a watermark processing method. The method may be applied to a client or a server. The method may include: acquiring target information, and acquiring watermark data corresponding to the target information; receiving a processing request for the target information; generating a target watermark according to watermark data corresponding to the target information; and executing the processing on the target information and the target watermark in response to the processing request.

For example, the target information includes at least one of: video data, text information, image information, and audio information.

Specifically, the specific process and the principle of the watermark processing method are consistent with those of the video watermark processing method as described in the above-described embodiments, and no details will be repeated here.

This embodiment may further provide an information transmitting method. The method includes: making the server store first target information and second target information, where the first target information and the second target information both contain same target information, the same target information in the first target information is embedded with watermark information, and the same target information and watermark parameter information are stored separately in the second target information;

making the server receive an acquiring request from a first terminal, where the acquiring request is used to request to acquire the same target information;

making the server select information to be sent to the first terminal from the first target information and the second target information according to the type of the acquiring request, and sending the selected information to the first terminal.

For example, in response to the type of the acquiring request being a play request, the server sends the second target information to the first terminal.

Or, in response to the type of the acquiring request being a download request or a forwarding request, the server sends the first target information to the first terminal.

In the watermark processing solution provided by the embodiments of the present disclosure, the first target information and the second target information are stored at the same time for the same target information, the second target information is transmitted in response to the play request, and the first target information is transmitted in response to the download request or the forwarding request, which may effectively provide different levels of copyright protection for different scenarios while improving a response speed of the server to the acquiring request. Moreover, the target information and the watermark parameter information separately stored are transmitted in the play scenario, which may also improve flexibility of watermark display and control at the player end.

Figure 15:
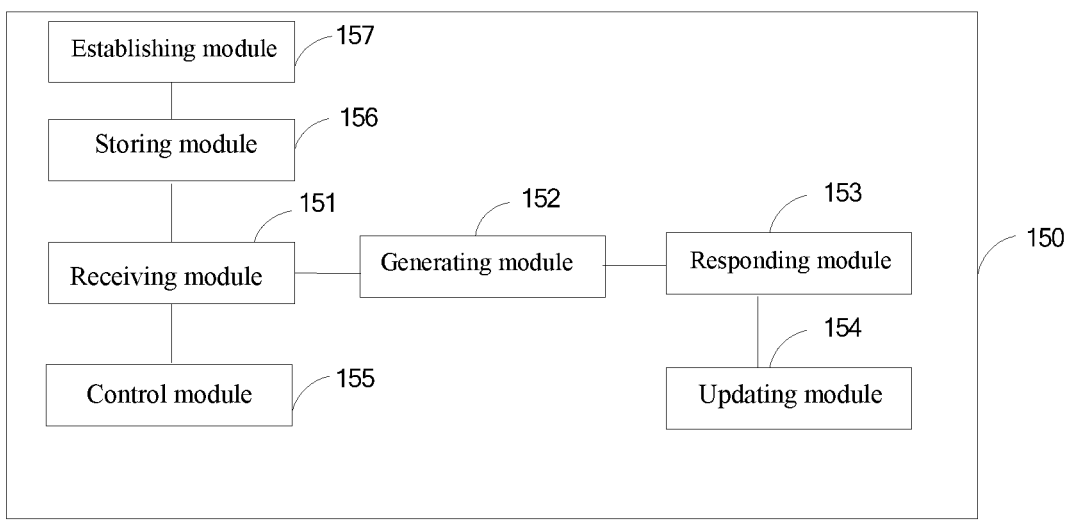
FIG. 15 is a structural schematic diagram of a video watermark processing apparatus according to an embodiment of the present disclosure.

FIG. 15 is a structural schematic diagram of a video watermark processing apparatus according to an embodiment of the present disclosure. The video watermark processing apparatus provided by the embodiment of the present disclosure may be configured in a client or a server. The video watermark processing apparatus 150 specifically includes:

a receiving module 151, configured to acquire video data and acquire watermark data corresponding to the video data, and further configured to receive a processing request for video data;

a generating module 152, configured to generate a target watermark according to watermark data corresponding to the video data; and a responding module 153, configured to process the video data and the target watermark in response to the processing request.

For example, in the case where the watermark data corresponding to the video data includes a plurality of watermark parameters, the generating module 152, when generating the target watermark according to the watermark data corresponding to the video data, is specifically configured to:

determine a target watermark parameter from the plurality of watermark parameters corresponding to the video data; and generate the target watermark according to the target watermark parameter.

For example, the processing request includes at least one of: a video data display request, a video data transmitting request, a video data download request, and a video data forwarding request.

For example, in the case where the processing request is a video data display request, the responding module 153, when processing the video data and the target watermark, is specifically configured to:

display the target watermark on a first display layer, and display the video data on a second display layer, where the first display layer is above the second display layer.

For example, the watermark data corresponding to the video data includes a first parameter; and the receiving module 151, when acquiring the watermark data corresponding to the video data, is specifically configured to:

acquire the first parameter corresponding to the video data, where the first parameter includes at least one of: position information of the first watermark in the video data, valid time of the first watermark, watermark content of the first watermark, and size information of the first watermark.

For example, the watermark data corresponding to the video data includes a second parameter; and the receiving module 151, when acquiring the watermark data corresponding to the video data, is specifically configured to:

acquire the second parameter corresponding to the video data, where the second parameter is used to determine watermark content of the target watermark.

For example, the second parameter includes at least one of:

source information of the video data, content type of the video data, activity participation information of the video data, and switch information of the first watermark.

For example, the generating module 152, when generating a target watermark according to the watermark data corresponding to the video data, is specifically configured to:

if the switch information of the first watermark indicates that the first watermark is turned on, generate watermark content of the first watermark;

and/or, if the source information of the video data meets a first preset condition, generate watermark content of the second watermark;

and/or, if the content type of the video data meets a second preset condition, generate watermark content of a third watermark;

and/or, if the activity participation information of the video data meets a third preset condition, generate watermark content of a fourth watermark;

determine watermark content of the target watermark according to at least one of the watermark content of the first watermark, the watermark content of the second watermark, the watermark content of the third watermark, and the watermark content of the fourth watermark;

generate a target watermark according to the watermark content of the target watermark.

For example, the target watermark includes the first watermark; and the watermark content of the first watermark includes author identification of the video data.

For example, the source information of the video data includes: author information of the video data.

The source information of the video data meeting the first preset condition includes:

the author information of the video data including author type.

For example, the author type includes at least one of: unicast author, exclusive author, and product author.

For example, the watermark content of the second watermark includes at least one of:

unicast identification, exclusive identification, and product identification.

For example, the content type of the video data meeting a second preset condition includes:

the content type of the video data including a preset type; and the watermark content of the third watermark including identification of a preset type.

For example, the activity participation information of the video data meeting the third preset condition includes:

the activity participation information of the video data including preset activity identification; and the watermark content of the fourth watermark including preset activity identification.

For example, the video watermark processing apparatus further includes: an updating module 154, which is configured to update the target watermark when the target watermark is invalid. The updated target watermark includes at least one of the first watermark, the second watermark, the third watermark, and the fourth watermark except the target watermark.

For example, the target watermark includes at least one type of information below:

author type identification information of the video data, where the author type identification information includes at least one type of unicast identification, exclusive identification, and product identification;

data source information of the video data, where the data source information has preset correspondence with the content of the video data;

activity identification information of the video data, where the activity identification information has preset correspondence with the content of the video data.

For example, correspondence between the data source information and the content of the video data is determined by identifying the content type of the video data in advance and based on an identification result;

and/or, correspondence between the activity identification information and the content of the video data is determined by receiving setting information of the content of the video data in advance.

For example, the watermark data corresponding to the video data includes a plurality of watermark parameters and priority information of the plurality of watermark parameters. Generating a target watermark according to the watermark data corresponding to the video data includes:

determining the target watermark parameter or display effect information of the target watermark from the plurality of watermark parameters, based on the priority information of the plurality of watermark parameters, and generating a target watermark based on the target watermark parameter or the display effect information.

For example, the watermark data corresponding to the video data includes at least one watermark parameter and valid condition information of the at least one watermark parameter, and the generating module 152, when generating a target watermark according to the watermark data corresponding to the video data, is specifically configured to:

determine whether to display the watermark corresponding to the at least one watermark parameter, based on the valid condition information of the at least one watermark parameter, or update the target watermark based on other valid watermark parameter after the watermark parameter on which the target watermark is based is invalid.

For example, the valid condition information includes validity period information or user permission information.

For example, the watermark parameter includes at least one type of information below for indicating the watermark content:

text information, static image information, and dynamic image information.

For example, the receiving module 151, when acquiring the video data and acquiring the watermark data corresponding to the video data, is specifically configured to:

acquire the video data from the server and acquire the watermark parameter corresponding to the video data.

The responding module 153, when processing the video data and the target watermark, is specifically configured to:

display the video data and the target watermark.

For example, the receiving module 151 is further configured to: receive indication information from the server. The indication information is used to indicate whether the video data includes a watermark.

The generating module 152, when generating a target watermark according to the watermark data corresponding to the video data, is specifically configured to:

if the indication information indicates that the video data does not include a watermark, generate the target watermark according to the watermark parameter corresponding to the video data.

For example, the receiving module 151 is further configured to: receive a display command of the preset information.

The video watermark processing apparatus further includes: a control module 155. The control module 155 is configured to control hiding the target watermark or reduce the amount of the target watermarks, according to the display command.

For example, the display command includes at least one of:

a command to display preset control icon, a command to display prompt information, a command to display text information, and a command to display graphic information.

For example, the preset control icon is configured to control at least one of play volume, play brightness, and play process of the video data.

For example, the display command includes a gesture control instruction; and the gesture control instruction is used to control at least one of play volume, play brightness, and play process of the video data.

For example, the receiving module 151, when acquiring the video data and acquiring the watermark data corresponding to the video data, is specifically configured to:

acquire the video data and the watermark data corresponding to the video data from the second terminal device.

In the case where the processing request is a video data transmitting request, the responding module 153, when processing the video data and the target watermark, is specifically configured to:

respectively send the video data and the target watermark to the first terminal.

For example, the receiving module 151, when acquiring the video data and acquiring the watermark data corresponding to the video data, is specifically configured to:

receive the video data and the indication information from a video cloud, where the indication information is used to indicate whether the video data includes a watermark.

If the indication information indicates that the video data does not include a watermark, the generating module 152 is further configured to generate watermark data corresponding to the video data.

For example, the video watermark processing apparatus may further include: a storing module 156 and an establishing module 157.

The storing module 156 is configured to store the video data and the watermark data respectively.

The establishing module 157 is configured to establish correspondence between the video data and the watermark data.

For example, in the case where the processing request is a video data download request or a video data forwarding request, the responding module 153, when processing the video data and the target watermark, is specifically configured to: send the video data containing the target watermark to the first terminal.

The video watermark processing apparatus provided by the embodiments of the present disclosure may execute the steps executed by the client or the server in the video watermark processing method provided by the embodiments of the present disclosure, and has corresponding functional modules and advantageous effects for executing the method.

Figure 16:
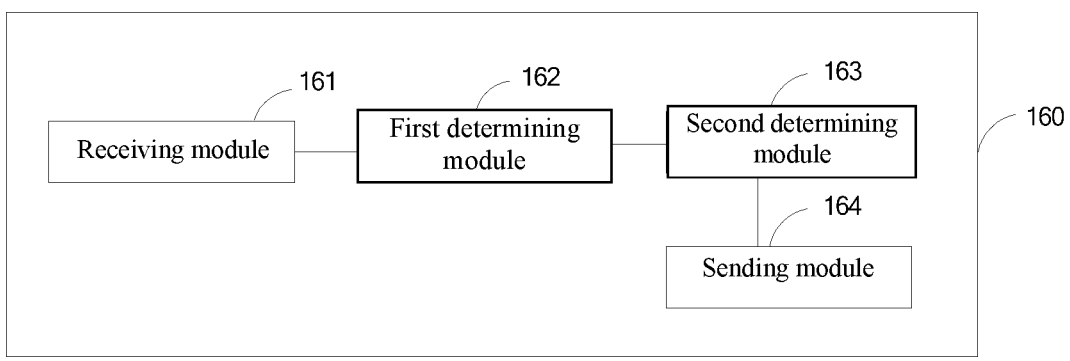
FIG. 16 is a structural schematic diagram of another video watermark processing apparatus according to an embodiment of the present disclosure.

FIG. 16 is a structural schematic diagram of a video watermark processing apparatus according to an embodiment of the present disclosure. The video watermark processing apparatus provided by the embodiment of the present disclosure may be configured in a client or a server. The video watermark processing apparatus 160 specifically includes:

a receiving module 161, configured to receive an acquiring request from the first terminal, where the acquiring request is used to request to acquire the video data;

a first determining module 162, configured to determine a watermark parameter of at least one watermark corresponding to the video data according to the acquiring request;

a second determining module 163, configured to determine the target watermark to be displayed currently according to the display condition of the at least one watermark;

a sending module 164, configured to send a response message carrying the target watermark and the video data to the first terminal.

For example, the second determining module 163, when determining the target watermark to be displayed currently according to the display condition of the at least one watermark, is specifically configured:

if the switch information of the first watermark indicates that the first watermark is turned on, then the target watermark to be displayed currently includes the first watermark;

if the source information of the video data meets the first preset condition, then the target watermark to be displayed currently includes the second watermark;

if the content type of the video data meets the second preset condition, then the target watermark to be displayed currently includes the third watermark; and if the activity participation information of the video data meets the third preset condition, then the target watermark to be displayed currently includes the fourth watermark.

For example, the sending module 164, when sending a response message carrying the target watermark and the video data to the first terminal, is specifically configured to:

send the video data containing the target watermark to the first terminal.

For example, the sending module 164, when sending a response message carrying the target watermark and the video data to the first terminal, is specifically configured to:

send the watermark parameter of the target watermark and the video data respectively to the first terminal.

The video watermark processing apparatus provided by the embodiments of the present disclosure may execute the steps executed by the server in the video watermark processing method provided by the embodiments of the present disclosure, and has corresponding functional modules and advantageous effects for executing the method.

Figure 17:
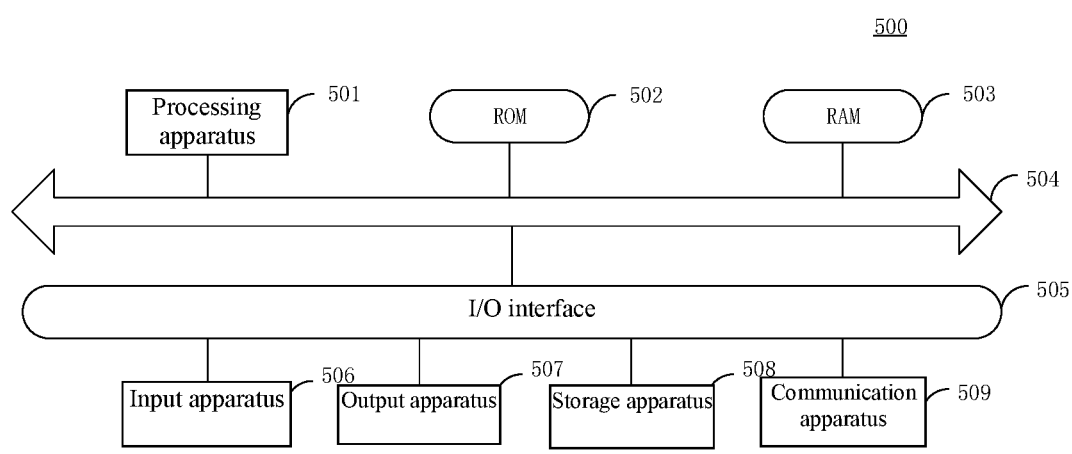
FIG. 17 is a structural schematic diagram of an electronic device according to an embodiment of the present disclosure.

FIG. 17 is a structural schematic diagram of an electronic device according to an embodiment of the present disclosure. Specifically referring to FIG. 17, it illustrates a structural schematic diagram of an electronic device 500 suitable for implementing the embodiments of the present disclosure. The electronic device 500 according to the embodiments of the present disclosure may include, but not limited to, a mobile terminal such as a mobile phone, a laptop, a digital broadcast receiver, a personal digital assistant (PDA), a tablet computer (PAD), a portable multimedia player (PMP), a vehicle-mounted terminal (e.g., a vehicle-mounted navigation terminal), etc., and a stationary terminal such as a digital TV, a desktop computer, etc. The electronic device illustrated in FIG. 17 is only an example, and should not impose any limitation on the function and use scope of the embodiments of the present disclosure.

As illustrated in FIG. 17, the electronic device 500 may include a processing apparatus (also referred to as a "processor", for example, a central processing unit, a graphics processor, etc.) 501, which may execute various appropriate actions and processing according to a program stored in a read-only memory (ROM) 502 or a program loaded from a storage apparatus 508 into a random access memory (RAM) 503. The RAM 503 further stores various programs and data required for operation of the electronic device 500. The processing apparatus 501, the ROM 502, and the RAM 503 are connected with each other through a bus 504. An input/output (I/O) interface 505 is also coupled to the bus 504.

Usually, apparatuses below may be coupled to the I/O interface 505: input apparatuses 506 including, for example, a touch screen, a touch pad, a keyboard, a mouse, a camera, a microphone, an accelerometer, a gyroscope, etc.; output apparatuses 507 including, for example, a liquid crystal display (LCD), a speaker, a vibrator, etc.; storage apparatuses 508 including, for example, a magnetic tape, a hard disk, etc.; and a communication apparatus 509. The communication apparatus 509 may allow the electronic device 500 to perform wireless or wired communication with other device so as to exchange data. Although FIG. 17 illustrates the electronic device 500 having various apparatuses, it should be understood that, it is not required to implement or have all the apparatuses illustrated, and the electronic device 500 may alternatively implement or have more or fewer apparatuses.

Particularly, according to the embodiments of the present disclosure, the flows described above referring to the flow charts may be implemented as computer software programs. For example, the embodiments of the present disclosure include a computer program product, which comprises a computer program carried on a nonvolatile computer-readable medium, the computer program contains program codes for executing the method illustrated in the flow chart. In such embodiments, the computer program may be downloaded and installed from the network via the communication apparatus 509, or installed from the storage apparatus 508, or installed from the ROM 502. When executed by the processing apparatus 501, the computer program executes the above-described functions limited in the methods (including the watermark processing method and the information transmitting method) according to the embodiments of the present disclosure.

It should be noted that the above-described computer-readable medium according to the present disclosure may be a computer-readable signal medium or a computer-readable storage medium, or any combination thereof. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage device; a magnetic storage device; or any suitable combination of the above. In the present disclosure, the computer-readable storage medium may be any tangible medium that contains or stores a program that may be used by or in conjunction with an instruction executing system, an apparatus, or a device. Rather, in the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

In some implementations, the client and the server may communicate with any network protocol currently known or to be researched and developed in the future such as HyperText transfer protocol (HTTP), and may communicate (via a communication network) and interconnect with digital data in any form or medium. Examples of communication networks include a local area network ("LAN"), a wide area network ("WAN"), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device. The above-described computer-readable medium carries one or more programs, and when executed by the electronic device (executed by one or more processors in the electronic device), the above-described one or more programs are capable of executing the above-describe functions defined in the methods (including the watermark processing method and the information transmitting method) according to the embodiments of the present disclosure.

For example, the above-described computer-readable medium carries one or more programs, and when the above-described one or more programs are executed by the electronic device (executed by one or more processors in the electronic device), the electronic device is made: acquire video data and acquire watermark data corresponding to the video data; receive a processing request for the video data; generate a target watermark according to the watermark data corresponding to the video data; and execute the processing on the video data and the target watermark in response to the processing request.

For example, the above-described computer-readable medium carries one or more programs, and when the above-described one or more programs are executed by the electronic device (executed by one or more processors in the electronic device), the electronic device is made: receive an acquiring request from the first terminal, where the acquiring request is used to request to acquire the video data; determine a watermark parameter of at least one watermark corresponding to the video data according to the acquiring request; determine a target watermark to be displayed currently according to a display condition of the at least one watermark; and send a response message carrying the target watermark and the video data to the first terminal.

For example, the above-described computer-readable medium carries one or more programs, and when the above-described one or more programs are executed by the electronic device (executed by one or more processors in the electronic device), the electronic device is made: acquire target information and acquire watermark data corresponding to the target information; receive a processing request for the target information; generate a target watermark according to the watermark data corresponding to the target information; and execute the processing on the target information and the target watermark in response to the processing request.

The computer program codes for executing the operations according to the present disclosure may be written in one or more programming languages or a combination thereof; the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by software or hardware. The name of the unit does not constitute limitation of the unit in some cases.

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium, which may contain or store programs for use by or in combination with an instruction execution system, an apparatus or a device. The machine-readable medium may be a machine-readable signal medium or a machine-readable storage medium.

Machine-readable media may include, but are not limited to, electronic, magnetic, optical, electromagnetic, infrared, or semiconductor systems, apparatuses, or devices, or any suitable combination of the above contents. A more specific example of the machine-readable storage medium may include an electrical connection based on one or more lines, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above contents.

For the present disclosure, the following is to be noted.

(1) The drawings of the embodiments of the present disclosure only relate to the structures relevant to the embodiments of the present disclosure, and other structures may be referred to the general design.

(2) In case of no conflict, the embodiments of the present disclosure and the features in the embodiments can be combined with each other to obtain new embodiments.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced each other to form a technical solution.

Furthermore, although the respective operations are described in a particular order, this should not be understood as requiring the operations to be executed in the particular order illustrated or in a sequential order. Under certain circumstances, multitasking and parallel processing may be favorable. Similarly, although the above discussion contains a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

What is claimed is:

1. A video watermark processing method, comprising:
   acquiring video data and acquiring watermark data corresponding to the video data;
   receiving a processing request for the video data;
   generating a target watermark according to the watermark data corresponding to the video data; and
   processing the video data and the target watermark in response to the processing request;
   wherein the watermark data corresponding to the video data comprises a plurality of watermark parameters and priority information of the plurality of watermark parameters, and
   generating the target watermark according to the watermark data corresponding to the video data comprises:
   determining a target watermark parameter or display effect information of the target watermark from the plurality of watermark parameters based on the priority information of the plurality of watermark parameters, and generating the target watermark based on the target watermark parameter or the display effect information;
   wherein the plurality of watermark parameters correspond to a plurality of watermarks, and the target watermark is a watermark selected from the plurality of watermarks based on the priority information,
   wherein a size of the target watermark is based on the plurality of watermark parameters.

2. The method according to claim 1, wherein
   generating the target watermark according to the watermark data corresponding to the video data further comprises:
   determining a target watermark parameter from the plurality of watermark parameters corresponding to the video data; and
   generating the target watermark according to the target watermark parameter.

3. The method according to claim 1, wherein the processing request comprises at least one selected from a group consisting of:
   a video data display request, a video data transmitting request, a video data download request, and a video data forwarding request;
   and/or, in a case where the processing request is the video data display request, processing the video data and the target watermark comprises:
   displaying the target watermark on a first display layer, and displaying the video data on a second display layer, wherein the first display layer is above the second display layer.

4. The method according to claim 1,
   wherein the watermark data corresponding to the video data comprises a first parameter;
   acquiring the watermark data corresponding to the video data comprises:
   acquiring the first parameter corresponding to the video data,
   wherein the first parameter comprises at least one selected from a group consisting of:
   position information of a first watermark in the video data, valid time of the first watermark, watermark content of the first watermark, and size information of the first watermark;
   and/or, the watermark data corresponding to the video data comprises a second parameter;
   acquiring the watermark data corresponding to the video data comprises:
   acquiring the second parameter corresponding to the video data, wherein the second parameter is used to determine watermark content of the target watermark;
   and/or, the second parameter comprises at least one selected from a group consisting of:
   source information of the video data, content type of the video data, activity participation information of the video data, and switch information of a first watermark;
   and/or, the switch information of the first watermark is determined according to permission information of an author or a platform of the video data.

5. The method according to claim 4, wherein generating the target watermark according to the watermark data corresponding to the video data further comprises:

executing at least one selected from a group consisting of:
in a case where the switch information of the first watermark indicates that the first watermark is turned on, generating watermark content of the first watermark;
in a case where the source information of the video data meets a first preset condition, generating watermark content of a second watermark;
in a case where the content type of the video data meets a second preset condition, generating watermark content of a third watermark;
in a case where the activity participation information of the video data meets a third preset condition, generating watermark content of a fourth watermark;
determining the watermark content of the target watermark, according to at least one selected from a group consisting of the watermark content of the first watermark, the watermark content of the second watermark, the watermark content of the third watermark, and the watermark content of the fourth watermark; and
generating the target watermark according to the watermark content of the target watermark;
and/or, the source information of the video data comprises author information of the video data; and
the source information of the video data meeting the first preset condition comprises:
the author information of the video data comprising author type;
and/or, the author type comprises at least one selected from a group consisting of:
unicast author, exclusive author, and product author;
and/or, the watermark content of the second watermark comprises at least one selected from a group consisting of:
unicast identification, exclusive identification, and product identification.

6. The method according to claim 5, wherein the content type of the video data meeting the second preset condition comprises:
the content type of the video data comprising a preset type; and
the watermark content of the third watermark comprising identification of the preset type;
and/or, the activity participation information of the video data meeting the third preset condition comprises:
the activity participation information of the video data comprising preset activity identification; and
the watermark content of the fourth watermark comprising the preset activity identification;
and/or, the method further comprises:
updating the target watermark in a case where the target watermark is invalid, wherein the target watermark that is updated comprises at least one watermark of the first watermark, the second watermark, the third watermark, and the fourth watermark except the target watermark.

7. The method according to claim 4, wherein the target watermark comprises the first watermark, and the watermark content of the first watermark comprises author identification of the video data.

8. The method according to claim 1, wherein the target watermark comprises at least one type of information below:
author type identification information of the video data, wherein the author type identification information comprises at least one type of unicast identification, exclusive identification, and product identification;
data source information of the video data, wherein the data source information has preset correspondence with content of the video data; and
activity identification information of the video data, wherein the activity identification information has preset correspondence with the content of the video data;
and/or, the correspondence between the data source information and the content of the video data is determined by identifying content type of the video data in advance and based on an identification result; and/or
the correspondence between the activity identification information and the content of the video data is determined by receiving setting information of the content of the video data in advance.

9. The method according to claim 1,
the watermark data corresponding to the video data further comprises valid condition information of the plurality of watermark parameters, and
generating the target watermark according to the watermark data corresponding to the video data further comprises:
determining whether to display a watermark corresponding to the plurality of watermark parameters based on the valid condition information of the plurality of watermark parameters, or
based on the valid condition information of the plurality of watermark parameters, updating the target watermark based on other valid watermark parameter after a watermark parameter on which the target watermark is based is invalid;
and/or, the valid condition information comprises validity period information or user permission information;
and/or, the user permission information comprises at least one of permission information of an author of the video data and permission information of player user of the video data.

10. The method according to claim 1, wherein the watermark data comprises at least one type of information below for indicating watermark content:
text information, static image information, and dynamic image information.

11. The method according to claim 1, wherein acquiring the video data and acquiring the watermark data corresponding to the video data comprises:
making a first terminal acquire the video data from a server and acquire the watermark data corresponding to the video data;
processing the video data and the target watermark comprises:
making the first terminal display the video data and the target watermark.

12. The method according to claim 11, further comprising:
making the first terminal receive indication information from the server, wherein the indication information is used to indicate whether the video data comprises a watermark;
generating the target watermark according to the watermark data corresponding to the video data further comprises:
in a case where the indication information indicates that the video data does not comprise a watermark, making the first terminal generate the target watermark according to the watermark data corresponding to the video data.

13. The method according to claim 11, further comprising:

making the first terminal receive a display command of preset information; and making the first terminal control hiding the target watermark or reduce an amount of the target watermark, according to the display command;

and/or, the display command comprises at least one selected from a group consisting of:

a command to display preset control icon, a command to display prompt information, a command to display text information, and a command to display graphic information;

and/or, the preset control icon is configured to control at least one of play volume, play brightness, and play process of the video data.

14. The method according to claim 13, wherein the display command comprises a gesture control instruction, and the gesture control instruction is used to control at least one of play volume, play brightness, and play process of the video data.

15. The method according to claim 1, wherein acquiring the video data and acquiring the watermark data corresponding to the video data comprises:

making a server acquire the video data and the watermark data corresponding to the video data from a second terminal device;

in a case where the processing request is a video data transmitting request, processing the video data and the target watermark comprises:

making the server respectively send the video data and the target watermark to a first terminal;

and/or, the method further comprises:

making the server store the video data and the watermark data, respectively; and making the server establish correspondence between the video data and the watermark data;

and/or, in a case where the processing request is a video data download request or a video data forwarding request, processing the video data and the target watermark comprises:

making the server send the video data containing the target watermark to the first terminal.

16. The method according to claim 1, wherein acquiring the video data and acquiring the watermark data corresponding to the video data comprises:

making a server receive the video data and indication information from a video cloud, wherein the indication information is used to indicate whether the video data comprises a watermark; and in a case where the indication information indicates that the video data does not comprise a watermark, making the server generate the watermark data corresponding to the video data.

17. An electronic device, comprising:

one or more processors; and a storage apparatus, configured to store one or more programs, wherein, when executed by the one or more processors, the one or more programs make the one or more processors implement the video watermark processing method according to claim 1.

18. A non-transitory computer-readable storage medium, wherein a computer program is stored on the non-transitory computer-readable storage medium, when executed by a processor, the computer program implements the video watermark processing method according to claim 1.

19. An information transmitting method, comprising:

making a server store first target information and second target information, wherein the first target information and the second target information both contain same target information, the same target information in the first target information is embedded with watermark information, and the same target information and watermark parameter information are stored separately in the second target information;

making the server receive an acquiring request from a first terminal, wherein the acquiring request is used to request to acquire the same target information; and making the server select information to be sent to a first terminal from the first target information and the second target information according to a type of the acquiring request, and sending selected information to the first terminal;

wherein the second target information comprises video data and watermark data corresponding to the video data, wherein the watermark data corresponding to the video data comprises a plurality of watermark parameters and priority information of the plurality of watermark parameters;

a target watermark parameter or display effect information of a target watermark is determined from the plurality of watermark parameters based on the priority information of the plurality of watermark parameters, and the target watermark is generated based on the target watermark parameter or the display effect information;

wherein the plurality of watermark parameters correspond to a plurality of watermarks, and the target watermark is a watermark selected from the plurality of watermarks based on the priority information, wherein a size of the target watermark is based on the plurality of watermark parameters.

20. The information transmitting method according to claim 19, wherein making the server select the information to be sent to the first terminal from the first target information and the second target information according to the type of the acquiring request, and sending the selected information to the first terminal, comprises:

making the server send the second target information to the first terminal in response to the type of the acquiring request being a play request; or making the server send the first target information to the first terminal in response to the type of the acquiring request being a download request or a forwarding request.

* * * * *